(12) United States Patent
Sugiyama

(10) Patent No.: US 8,823,908 B2
(45) Date of Patent: Sep. 2, 2014

(54) DISPLAY APPARATUS

(75) Inventor: Koichi Sugiyama, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 260 days.

(21) Appl. No.: 13/495,765

(22) Filed: Jun. 13, 2012

(65) Prior Publication Data

US 2012/0320315 A1 Dec. 20, 2012

(30) Foreign Application Priority Data

Jun. 14, 2011 (JP) .................................. 2011-132565

(51) Int. Cl.
*G02F 1/133* (2006.01)

(52) U.S. Cl.
USPC ........................................................ 349/116

(58) Field of Classification Search
USPC ........................................................ 349/116
See application file for complete search history.

(56) References Cited

U.S. PATENT DOCUMENTS

| 5,396,257 A | 3/1995 | Someya et al. |
| 2008/0192157 A1* | 8/2008 | Gan et al. ..................... 349/25 |
| 2011/0102393 A1* | 5/2011 | Tanaka et al. ................ 345/207 |

FOREIGN PATENT DOCUMENTS

JP 5-173523 A 7/1993

* cited by examiner

*Primary Examiner* — Timothy L Rude

(74) *Attorney, Agent, or Firm* — Birch, Stewart, Kolasch & Birch, LLP

(57) ABSTRACT

A display apparatus which comprises a liquid crystal panel and displays a predetermined image comprises: a reflective panel which is arranged opposite to the liquid crystal panel and reflects light emitted from the liquid crystal panel; and image capture devices which are located in the liquid crystal panel and capture an image on a display surface of the liquid crystal panel using light reflected by the reflective panel. An image display condition of the liquid crystal panel of the display apparatus is captured by the display apparatus itself.

7 Claims, 21 Drawing Sheets

DURING DISPLAY
(STATE WHERE TRANSMISSION-REFLECTION IMAGE ELEMENT CAUSES LIGHT TO TRANSMIT)

DURING SENSING
(STATE WHERE TRANSMISSION-REFLECTION IMAGE ELEMENT REFLECTS LIGHT)

IMAGE CAPTURE AREA

F I G. 1 1
①
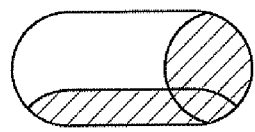
②
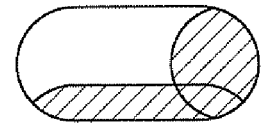
③
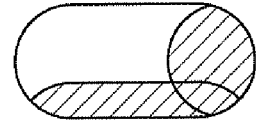
④

DISPLAY APPARATUS

CROSS-REFERENCE TO RELATED APPLICATIONS

This non-provisional application claims priority under 35 U.S.C. §119(a) on Patent Application No. 2011-132565 filed in Japan on Jun. 14, 2011, the entire contents of which are hereby incorporated by reference.

BACKGROUND

1. Technical Field

The present invention relates to a display apparatus which comprises a liquid crystal panel provided with a plurality of pixels and displays an image.

2. Description of Related Art

In recent years, various techniques have been developed for improving image quality of a display apparatus.

For example, Japanese Patent Application Laid-Open No. 5-173523 (1993) discloses a multi-screen display in which screens of cores of the multi-screen display are divided into a plurality of blocks, a data converter for adjusting a video signal is provided for each core, the data converters are provided with LUTs respectively, and data of each data converter is adjusted by an arithmetic and control unit using an interpolation calculation processing so that a luminance is uniform in each core and a luminance is uniform among cores, and thereby correcting a luminance unevenness and achieving higher image quality.

SUMMARY

On the other hand, in a display apparatus, such as a display for advertisement located in a street or a passage etc. and a display for guidance located in a station yard, for example, it is necessary to appropriately check a lighting condition of sub pixels or pixels constituting a liquid crystal panel of the display apparatus. For this reason, a troublesome method has been used, such as a method in which an operator or manager goes to installation sites and visually confirms image display conditions of the display apparatuses, or a method in which the operator or manager remotely monitors the image display conditions with a camera installed separately, or the like. In the above-described multi-screen display disclosed in Japanese Patent Application Laid-Open No. 5-173523 (1993), a method for confirming an image display condition, etc. are not considered, and therefore such a problem cannot be solved.

The present invention has been made with the aim of solving the above problems, and it is an object of the invention to provide a display apparatus which comprises a liquid crystal panel and displays a predetermined image comprising: a reflective panel which is arranged opposite to the liquid crystal panel and reflects light emitted from the liquid crystal panel; and image capture devices which capture an image using light reflected by the reflective panel, wherein an image display condition of the liquid crystal panel of the display apparatus is captured by the display apparatus itself, thereby for example, an operator or manager can remotely maintain the display apparatus in displaying with a use of an image based on captured data during an actual operation.

The display apparatus according to the present invention is a display apparatus which comprises a liquid crystal panel provided with a plurality of pixels and displays an image, comprising: a reflective panel which is arranged opposite to the liquid crystal panel, and reflects light emitted from the liquid crystal panel; and image capture devices which are located in the liquid crystal panel, and captures an image using light reflected by the reflective panel.

In the present invention, the reflective panel is arranged opposite to the liquid crystal panel, and reflects light emitted from the liquid crystal panel toward the liquid crystal panel. In this case, the image capture devices located in the liquid crystal panel capture an image using light reflected by the reflective panel.

The display apparatus according to the present invention is characterized in that the reflective panel is provided with; reflective image elements which are provided with a reflective surface in a face opposite to the liquid crystal panel; and transmissive image elements which cause light emitted from the pixel to transmit selectively.

In the present invention, the reflective image element of the reflective panel includes a reflective surface in a face opposite to the liquid crystal panel, and reflects light emitted from the liquid crystal panel toward the liquid crystal panel. The transmissive image element of the reflective panel causes light emitted from the pixel to transmit selectively.

The display apparatus according to the present invention is characterized in that, in the reflective panel, reflection dots including the reflective image elements and the transmissive image elements are arranged in a two-dimensional array, and in the liquid crystal panel, display dots including the pixels and the image capture devices are arranged in a two-dimensional array, and the reflection dots are aligned with the display dots with respect to positions thereof in an opposed direction in which the reflective panel is arranged opposite to the liquid crystal panel.

In the present invention, in the reflective panel the reflection dots are arranged in a two-dimensional array, and in the liquid crystal panel the display dots are arranged in a two-dimensional array. The reflection dots are aligned with the display dots with respect to positions thereof in the opposed direction in which the reflective panel is arranged opposite to the liquid crystal panel.

The display apparatus according to the present invention is characterized in that the image capture device is arranged opposite to the reflective image element, and the pixel is arranged opposite to the transmissive image element, and a part of the reflective image element overlaps with the pixel.

In the present invention, the image capture device is arranged opposite to the reflective image element with respect to positions thereof in the opposed direction in which the reflective panel is arranged opposite to the liquid crystal panel, and the pixel is aligned with the transmissive image element with respect to positions thereof in the opposed direction in which the reflective panel is arranged opposite to the liquid crystal panel. Moreover, a part of the reflective image element overlaps with the pixel, and thereby light reflected by the reflective image element enters the image capture device more reliably.

The display apparatus according to the present invention is characterized in that the reflective panel is provided with a transmission-reflection image element which causes light emitted from the pixel to transmit or reflect.

In the present invention, the transmission-reflection image element of the reflective panel causes light emitted from the pixel to transmit or reflects the light. When the transmission-reflection image element reflects the light, the transmission-reflection image element reflects the light emitted from the liquid crystal panel toward the liquid crystal panel. The image capture devices capture an image using light reflected by the reflective panel.

The display apparatus according to the present invention is characterized in that, in the reflective panel, the transmission-reflection image elements are arranged in a two-dimensional array, and in the liquid crystal panel, display dots including the pixels and the image capture devices are arranged in a two-dimensional array, and the transmission-reflection image elements are aligned with the display dots with respect to positions thereof in an direction in which the reflective panel is arranged opposite to the liquid crystal panel.

In the present invention, the transmission-reflection image elements are arranged in a two-dimensional array in the reflective panel, and the display dots are arranged in a two-dimensional array in the liquid crystal panel. Moreover, the transmission-reflection image elements are aligned with the display dots with respect to positions thereof in the opposed direction in which the liquid crystal panel is arranged opposite to the reflective panel.

The display apparatus according to the present invention is characterized in that the transmission-reflection image element comprises: two polarized light selectors which are arranged in a direction in which polarization axes are orthogonal; and a liquid crystal layer held between the polarized light selectors.

According to the present invention, since the display apparatus can capture an image display condition of the liquid crystal panel of the display apparatus by the display apparatus itself, for example, an operator or manager can remotely maintain the display apparatus using an image based on captured data, and does not need to go to an installation site.

The above and further objects and features will more fully be apparent from the following detailed description with accompanying drawings.

BRIEF DESCRIPTION OF THE SEVERAL VIEWS OF THE DRAWINGS

FIG. 11 is an explanatory diagram explaining the alignment using the lattice pattern in the display apparatus according to the present invention;

DETAILED DESCRIPTION

Embodiment 1

The following description will explain an example in which a display apparatus according to the present invention is a large-sized liquid crystal display, such as a digital signage, based on the drawings.

Figure 1:
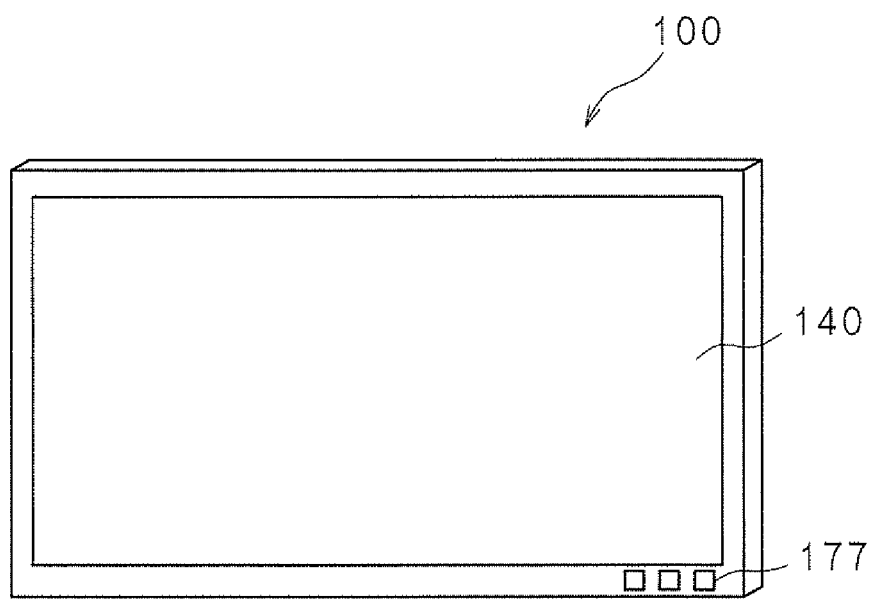
FIG. 1 is a diagram showing an external appearance of a display apparatus according to the present invention.

FIG. 1 is a diagram showing an external appearance of a display apparatus 100 according to the present invention.

The display apparatus 100 comprises a display panel section 140 provided with a built-in photosensor.

Figure 2:
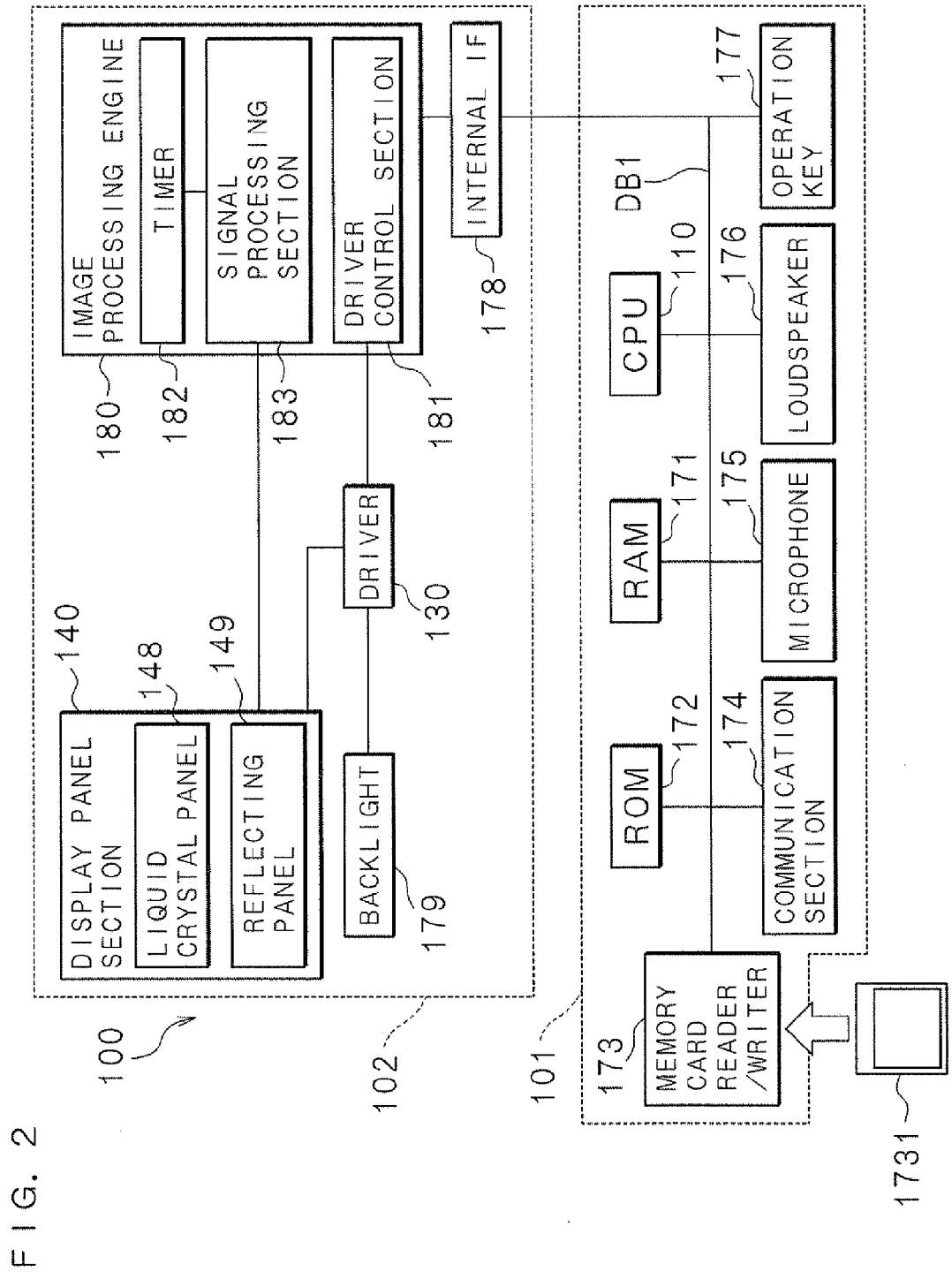
FIG. 2 is a functional block diagram showing an essential configuration of the display apparatus according to the present invention.

FIG. 2 is a functional block diagram showing an essential configuration of the display apparatus 100 according to the present invention. The display apparatus 100 comprises an arithmetic processing unit 101 and a display processing unit 102.

Note that the arithmetic processing unit 101 may be an electronic information device, such as a personal computer (PC). In this case, the arithmetic processing unit 101 and the display processing unit 102 do not need to be integrally provided.

The arithmetic processing unit 101 comprises a CPU 110, a RAM 171, a ROM 172, a memory card reader/writer 173, a communication section 174, a microphone 175, a loudspeaker 176, and an operation key 177. The respective components are connected to each other via a data bus DB1. A memory card 1731 is mounted to the memory card reader/writer 173.

The CPU 110 executes programs. The operation key 177 accepts input of an instruction by a user of the display apparatus 100. The RAM 171 temporarily stores data generated associated with an program execution by the CPU 110 or data inputted via the operation key 177. The ROM 172 stores data as non-volatile storage. The ROM 172 is a ROM which is capable of writing and erasing data, such as an EPROM (Erasable Programmable Read-Only Memory), a flash memory, etc. The communication section 174 wirelessly communicates with other electronic devices (not shown). Although such a configuration is not illustrated in FIG. 2, the display apparatus 100 may be configured so as to comprise an interface (IF) for connecting with other electronic devices via a wire.

The display processing unit 102 comprises a driver 130, the display panel section 140, an internal IF (Interface) 178, a backlight 179, and an image processing engine 180.

The driver 130 is a drive circuit for driving the display panel section 140 and the backlight 179. Various kinds of drive circuits included in the driver 130 are described later.

The display panel section 140 includes a liquid crystal panel 148 and a reflective panel 149. The liquid crystal panel 148 is a device which includes a plurality of pixels and a function as a liquid crystal display, and is also a device which includes an image capture device and a function as a photosensor. That is, the liquid crystal panel 148 can perform display of an image using liquid crystal and sensing (image capture) using the photosensor. The reflective panel 149 reflects light emitted from the liquid crystal panel 148, and returns it toward the liquid crystal panel 148.

The internal IF 178 transmits signal data including video received from the arithmetic processing unit 101, to the display processing unit 102. For example, the connection may be performed based on a standard, such as an analogs VGA, a DVI (Digital Visual Interface), an HDMI (High Definition Multimedia Interface), a Displayport, and an RS-232C, etc. The signal data does not need to be communicated via one IF. For example, IFs may be provided for a video signal, a voice signal and a control signal, respectively. The internal IF 178 may be configured so as to transmit and receive signal data to and from not only the arithmetic processing unit 101 but also an information device, such as a PC.

The backlight 179 is a light source arranged on a rear face side of the display panel section 140 (liquid crystal panel 148). The backlight 179 irradiates a rear face of the display panel section 140 (liquid crystal panel 148) with uniform light.

The image processing engine 180 controls an operation of the display panel section 140 via the driver 130. Here, such a control is performed based on various signal data sent from the arithmetic processing unit 101 via the internal IF 178. Note that the various signal data contains a later-described command (for example, sensing instruction). The image processing engine 180 processes data inputted via the display panel section 140, and sends the processed data to the arithmetic processing unit 101 via the internal IF 178. The image processing engine 180 includes a driver control section 181, a timer 182, and a signal processing section 183.

The driver control section 181 sends a control signal to the driver 130 to control an operation of the driver 130. The driver control section 181 analyzes a command sent from the arithmetic processing unit 101. Then, the driver control section 181 sends a control signal based on a result of the analysis to the driver 130. The details of an operation of the driver 130 will be described later.

The timer 182 generates time information and sends the time information to the signal processing section 183. The signal processing section 183 accepts data outputted from the photosensor. Here, since the data outputted from the photosensor is analog data, the signal processing section 183 first converts the analog data into digital data. The signal processing section 183 processes the digital data according to the contents of a command sent from the arithmetic processing unit 101. Then, the signal processing section 183 sends data containing the processed data and time information acquired from the timer 182 (hereinafter referred to as response data) to the arithmetic processing unit 101.

Note that the timer 182 does not need to be located in the image processing engine 180. For example, the timer 182 may be located outside the image processing engine 180 in the display processing unit 102. Or the timer 182 may be located inside the arithmetic processing unit 101. Also, the display apparatus 100 is not always provided with the microphone 175 and the loudspeaker 176, and the display apparatus 100 may be provided with any one of the microphone 175 and the loudspeaker 176, or may not be provided with both of them, depending on applications of the display apparatus 100.

In the present embodiment, the driver 130 (except for the circuit for driving the backlight 179), the internal IF 178 and the image processing engine 180 are integrally formed on a glass substrate of the liquid crystal panel 148.

By the way, the processing in the display apparatus 100 is realized by software executed by respective hardware devices and the CPU 110. Such software is sometimes stored in the ROM 172 in advance. Or, the software is sometimes stored in the memory card 1731 or the other storage medium and is distributed as a program product. Alternatively, the software is sometimes provided as a downloadable program product by an information provider connected to the so-called Internet. Such software is read from the storage medium by the memory card reader/writer 173 or the other reader, or is downloaded via the communication section 174 or a communication IF (not shown), and then stored in the ROM 172. The software is read from the ROM 172 by the CPU 110 and is stored in the RAM 171 in the form of an executable program. The CPU 110 executes the program.

Figure 3:
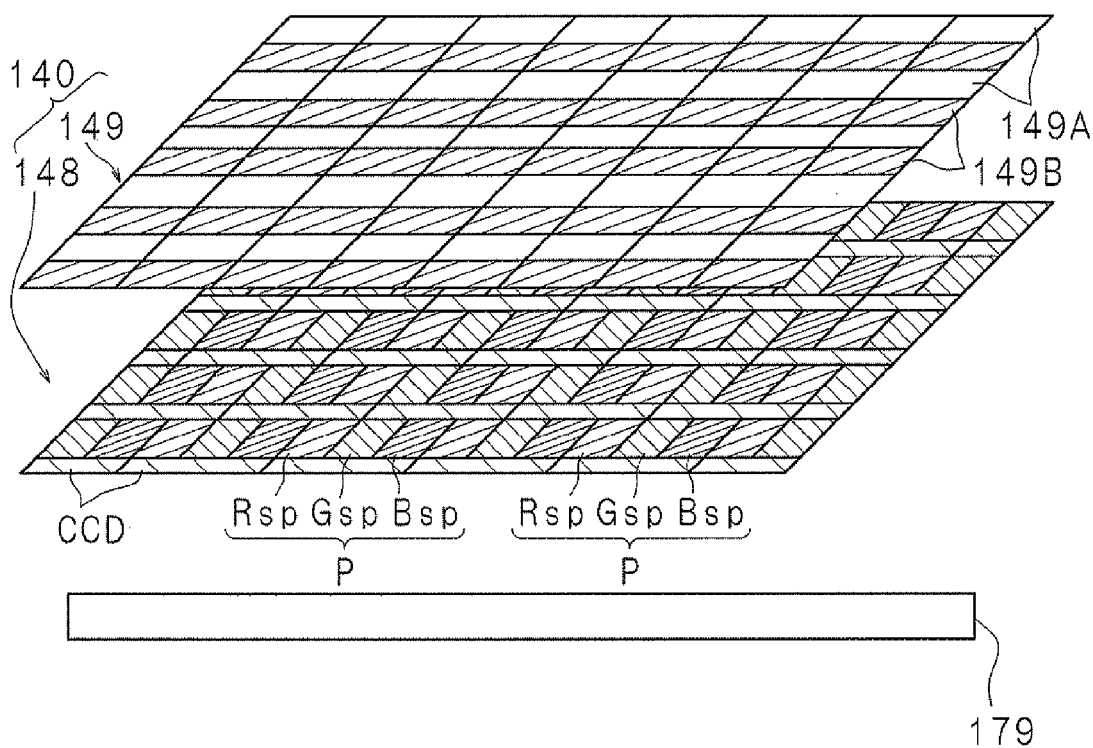
FIG. 3 is a schematic diagram showing a display panel section and a backlight in the display apparatus according to the present invention.

FIG. 3 is a schematic diagram showing the display panel section 140 and the backlight 179 in the display apparatus 100 according to the present invention.

The display panel section 140 includes the liquid crystal panel 148 and the reflective panel 149, as described above. The reflective panel 149 is located on a front side of the liquid crystal panel 148, and the backlight 179 is located on the back side of the liquid crystal panel 148. The liquid crystal panel 148 and the reflective panel 149 are located so that they face each other. Therefore, light emitted by the backlight 179 transmits the liquid crystal panel 148, and advances toward the reflective panel 149.

The liquid crystal panel 148 is provided with a plurality of pixels P which display a predetermined image using light emitted from the backlight 179. The pixels P are arranged in a two-dimensional array and include R image element Rsp having red color filter, G image element Gsp having green color filter, and B image element Bsp having blue color filter.

The liquid crystal panel 148 is further provided with a plurality of image capture devices CCD arranged in a two-dimensional array. Each of the image capture devices CCD is provided with a photodiode (not shown) and a thin film transistor (not shown), uses the photoelectric effect by the photodiode and replaces the intensity of light with an amount of charges, and therefore the image capture device itself are known. The image capture devices CCD use the backlight 179 as the light source, and capture an image using light which transmits the liquid crystal panel 148 and is reflected by the reflective panel 149. In other words, an image showing an appearance on the front side of the liquid crystal panel 148 is reflected by the reflective panel 149, and the image capture devices CCD capture the image. Image capture data obtained by the image capture device CCD is sent to the signal processing section 183. For example, the signal processing section 183 acquires image capture data from each image capture device CCD, and creates image data representing an overall image on the front side of the liquid crystal panel 148 based on the image capture data, and the created image data is displayed on the liquid crystal panel 148, or is sent to an external device via the communication section 174.

The reflective panel 149 is provided with a plurality of transmissive image elements 149A and reflective image elements 149B, and the transmissive image elements 149A and the reflective image elements 149B are arranged in a two-dimensional array.

The transmissive image element 149A blocks light which has transmitted the liquid crystal panel 148 (pixels P) or causes the light to transmit itself. In detail, in the same manner as a so-called white image element, a color filter is not attached to the transmissive image element 149A, or a transparent color filter is attached to the transmissive image element 149A. Therefore, the driver 130 changes voltage to be applied to the transmissive image elements 149A, thereby causing light emitted from the liquid crystal panel 148 to selectively transmit the transmissive image elements 149A.

A low reflection surface is formed on a front side of each reflective image element 149B, and a specular surface is formed on a back side thereof, and the specular surface reflects the light which has transmitted the liquid crystal panel 148 (pixels P). The specular surface is composed of a thin film, such as aluminum or silver, for example.

Figure 4:
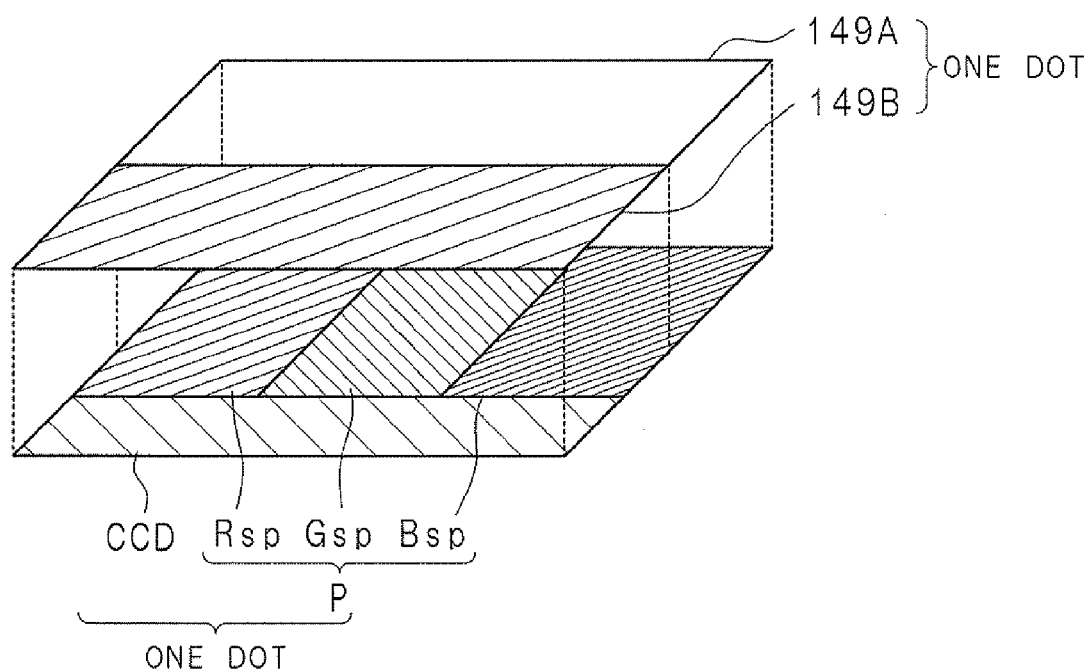
FIG. 4 is an explanatory diagram explaining a positional relationship of a pixel, an image capture device, a transmissive image element and a reflective image element in the display apparatus according to the present invention.
Figure 5:
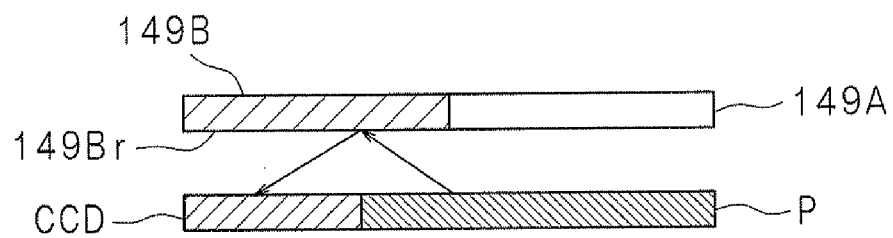
FIG. 5 is an explanatory diagram explaining a positional relationship of a pixel, an image capture device, a transmissive image element and a reflective image element in the display apparatus according to the present invention.

FIGS. 4 and 5 are explanatory diagrams explaining a positional relationship of the pixel P, the image capture device CCD, the transmissive image element 149A and the reflective image element 149B in the display apparatus 100 according to the present invention.

A pair of the pixel P and the image capture device CCD constitutes one dot, and a pair of the transmissive image element 149A and the reflective image element 149B constitutes one dot. The dot which is constituted by the pixel P and the image capture device CCD, and the dot which is constituted by the transmissive image element 149A and the reflective image element 149B have the same area in which the reflective panel 149 and the liquid crystal panel 148 are opposed to each other, and are located so that positions of the dots align. The image capture device CCD is arranged opposite to the reflective image element 149B, and the pixel P is arranged opposite to the transmissive image element 149A.

The image capture device CCD and the reflective image element 149B have a rectangular shape, and are located so that longitudinal directions thereof are the same direction. A dimension in a direction of the shorter side of the reflective image element 149B (width of the reflective image element 149B) is larger than a width of the image capture device CCD. Therefore, a part of a width direction (direction of the shorter side) of the reflective image element 149B overlaps with the pixel P. That is, as shown in FIG. 5, an image on a front side of the pixel P is reflected by the specular surface 149Br of the reflective image element 149B, and enters the image capture device CCD reliably.

Figure 6:
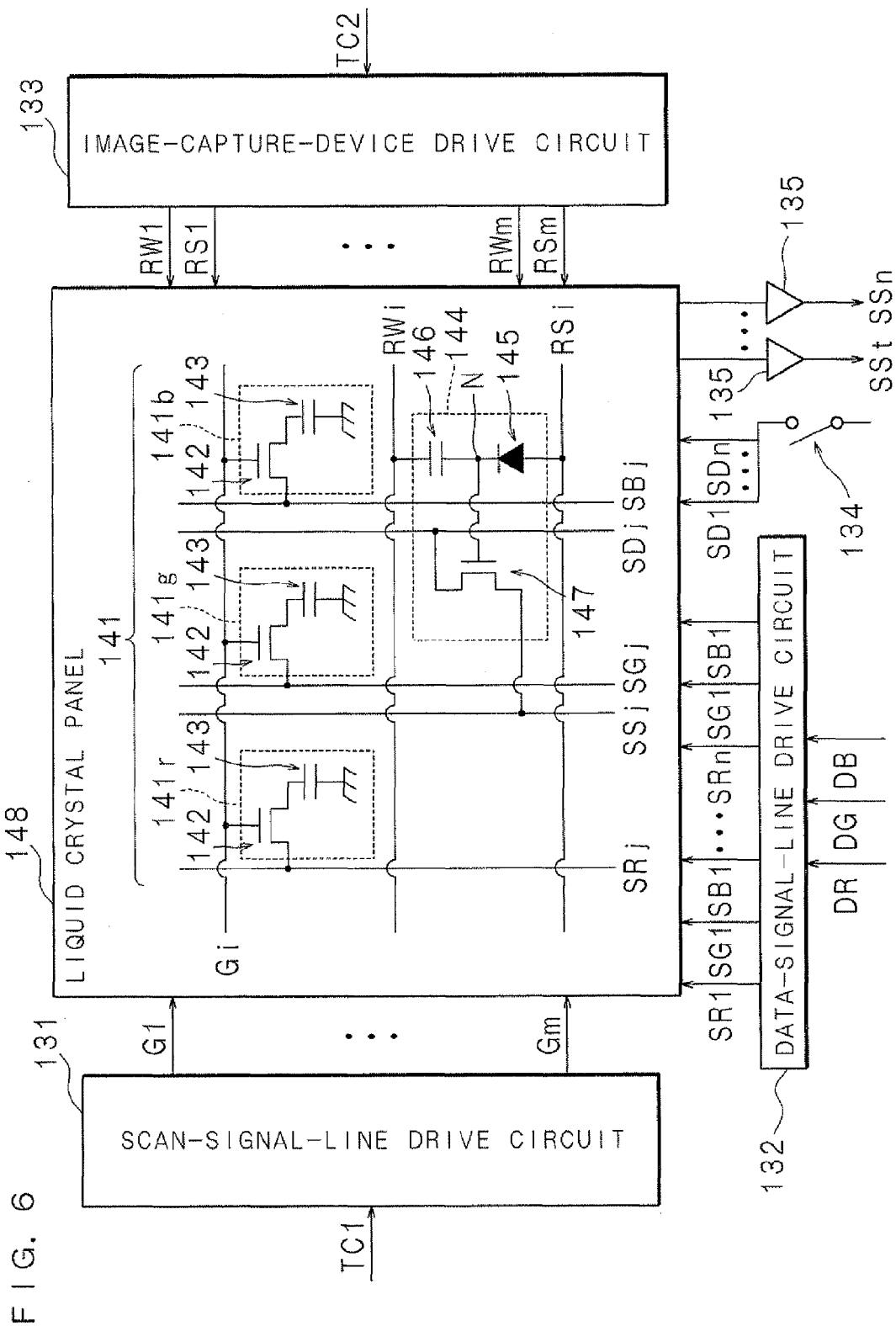
FIG. 6 is a diagram showing circuits for drive of a liquid crystal panel and peripheral circuits of the liquid crystal panel in the display apparatus according to the present invention.

Next, a configuration of the display panel section 140 and configurations of peripheral circuits of the display panel section 140 are explained. FIG. 6 is a diagram showing circuits for driving the liquid crystal panel 148 and peripheral circuits of the liquid crystal panel 148 in the display apparatus 100 according to the present invention.

The liquid crystal panel 148 is provided with a pixel circuit 141 for driving the pixels P, and an image capture device circuit 144 for driving the image capture devices CCD. The liquid crystal panel 148 is further provided with a scan signal line Gi, a data signal line SRj, a data signal line SGj, a data signal line SBj, a sensor signal line SSj, a sensor signal line SDj, a read signal line RWi, and a reset signal line RSi. Note that T is the natural number satisfying $1 \leq i \leq m$, and 'j' is the natural number satisfying $1 \leq j \leq n$.

The driver 130 of the display processing unit 102 shown in FIG. 2 includes a scan-signal-line drive circuit 131, a data-signal-line drive circuit 132, an image-capture-device drive circuit 133, a switch 134, and an amplifier 135 as the peripheral circuits of the display panel section 140.

The scan-signal-line drive circuit 131 accepts a control signal TC1 from the driver control section 181 shown in FIG. 2. Then, the scan-signal-line drive circuit 131 applies predetermined voltage to the respective scan signal lines (G1-Gm) beginning at the scan signal line G1, based on the control signal TC1. In more detail, the scan-signal-line drive circuit 131 sequentially selects one scan signal line from the scan signal lines (G1-Gm) for each unit time, and applies to the selected scan signal line voltage which is capable of turning on a gate of a later-described TFT (Thin Film Transistor) 142 (hereinafter referred to as high-level voltage). Note that the scan-signal-line drive circuit 131 still applies low-level voltage to the scan signal lines which are not selected, without applying the high-level voltage to them.

The data-signal-line drive circuit 132 accepts image data (DR, DG, DB) from the driver control section 181 shown in FIG. 2. Then, the data-signal-line drive circuit 132 sequentially applies voltage corresponding to image data for one line to 3×n data signal lines (SR1-SRn, SG1-SGn, SB1-SBn) for each unit time.

The pixel circuit 141 is a circuit for setting a luminance (transmittance) of one pixel. The m×n pixel circuits 141 are arranged in a matrix form. In more detail, the m pixel circuits 141 are arranged in a vertical direction of FIG. 6, and the n pixel circuits 141 are arranged in a lateral direction thereof.

Each of the pixel circuits 141 includes an R image element circuit 141r for driving the R image element Rsp, and a G image element circuit 141g for driving the G image element Gsp, and B image element circuit 141b for driving the B image element Bsp. Each of these three circuits (141r, 141g, 141b) appropriately drives the TFT 142, an electrode pair 143 having a pixel electrode and a counter electrode, and a capacitor (not shown) which constitute each image element (Rsp, Gsp, Bsp).

Since a CMOS (Complementary Metal Oxide Semiconductor) from which a n-type transistor and a p-type transistor can be formed can be realized, and since movement speed of a carrier (an electron or an electron hole) is hundreds times faster than that of an amorphous silicon thin film transistor (a-Si TFT), and the like, in the display processing unit 102, a polycrystalline silicon thin film transistor (p-Si TFT) is used as the TFT 142. Note that the TFT 142 is explained as a field-effect transistor of an n-type channel. However, the TFT 142 may be a field-effect transistor of a p-type channel.

A source of the TFT 142 in the R image element circuit 141*r* is connected to the data signal line SRj. The gate of the TFT 142 is connected to the scan signal line Gi. Also, a drain of the TFT 142 is connected to the pixel electrode of the electrode pair 143. Then, liquid crystal is provided between the pixel electrode and the counter electrode. Since the G image element circuit 141*g* and the B image element circuit 141*b* are configured in the same manner as the R image element circuit 141*r* except that a data signal line to which a source of each TFT 142 is connected differs, the description of these two circuits (141*g*, 141*b*) is omitted.

Here, a method for setting a luminance of the pixel circuit 141 is explained. First, the high-level voltage is applied to the scan signal line Gi. By the application of the high-level voltage, the gate of the TFT 142 is turned on. Thus, in a state in which the gate of the TFT 142 is turned on, voltage which is specified respectively (voltage corresponding to image data for one pixel) is applied to each data signal line (SRj, SGj, SBj). Thereby, voltage based on the specified voltage is applied to the pixel electrode. As a result, a potential difference occurs between the pixel electrode and the counter electrode. Based on the potential difference, liquid crystal respond and a luminance of a pixel is set to predetermined luminance.

The image-capture-device drive circuit 133 accepts a control signal TC2 from the driver control section 181 shown in FIG. 2.

Then, the image-capture-device drive circuit 133 sequentially selects one signal line from the reset signal lines (RS1-RSm) for each unit time based on the control signal TC2, and applies voltage VDDR of a level higher than usual to the selected signal line at a predetermined timing. Note that voltage VSSR lower than the voltage applied to the selected reset signal line is still applied to the reset signal lines which are not selected. For example, the voltage VDDR may be set to 0 V and the voltage VSSR may be set to −5 V.

The image-capture-device drive circuit 133 sequentially selects one signal line from the read signal lines (RW1-RWm) for each unit time based on the control signal TC2, and applies voltage VDD of a level higher than usual to the selected signal line at a predetermined timing. Note that the voltage VSSR is still applied to the read signal lines which are not selected. For example, the voltage VDD may be set to 8V.

Note that the timing at which the voltage VDDR is applied, and the timing at which the voltage VDD is applied are described later.

The image capture device circuit 144 appropriately drives the photodiode 145, the capacitor 146 and the TFT 147 and the like which constitute the image capture device CCD. Note that in the following description, the TFT 147 is explained as a field-effect transistor of an n-type channel. However, the TFT 147 may be a field-effect transistor of a p-type channel.

An anode of the photodiode 145 is connected to the reset signal line RSi. On the other hand, a cathode of the photodiode 145 is connected to one electrode of the capacitor 146. Another electrode of the capacitor 146 is connected to the read signal line RWi. Note that in the following description, a connecting point of the photodiode 145 and the capacitor 146 is called a node N.

A gate of the TFT 147 is connected to the node N. A drain of the TFT 147 is connected to the sensor signal line SDj. Also, a source of the TFT 147 is connected to the sensor signal line SSj. The details of the sensing with a use of the image capture device circuit 144 will be described later.

The switch 134 is a switch provided to switch application or non-application of predetermined voltage to the sensor signal lines (SD1-SDn). The switch 134 is switched by the image-capture-device drive circuit 133. Note that the voltage to be applied to the sensor signal lines (SD1-SDn) when the switch 134 is in a switch-on state will be described later.

The amplifier 135 amplifies voltage outputted from each sensor signal line (SS1-SSn). Note that the amplified voltage is sent to the signal processing section 183 shown in FIG. 2.

Note that the image processing engine 180 controls the timing at which an image is displayed on the liquid crystal panel 148 by the pixel circuit 141, and the timing at which the sensing is performed by the image capture device circuit 144.

Figure 7:
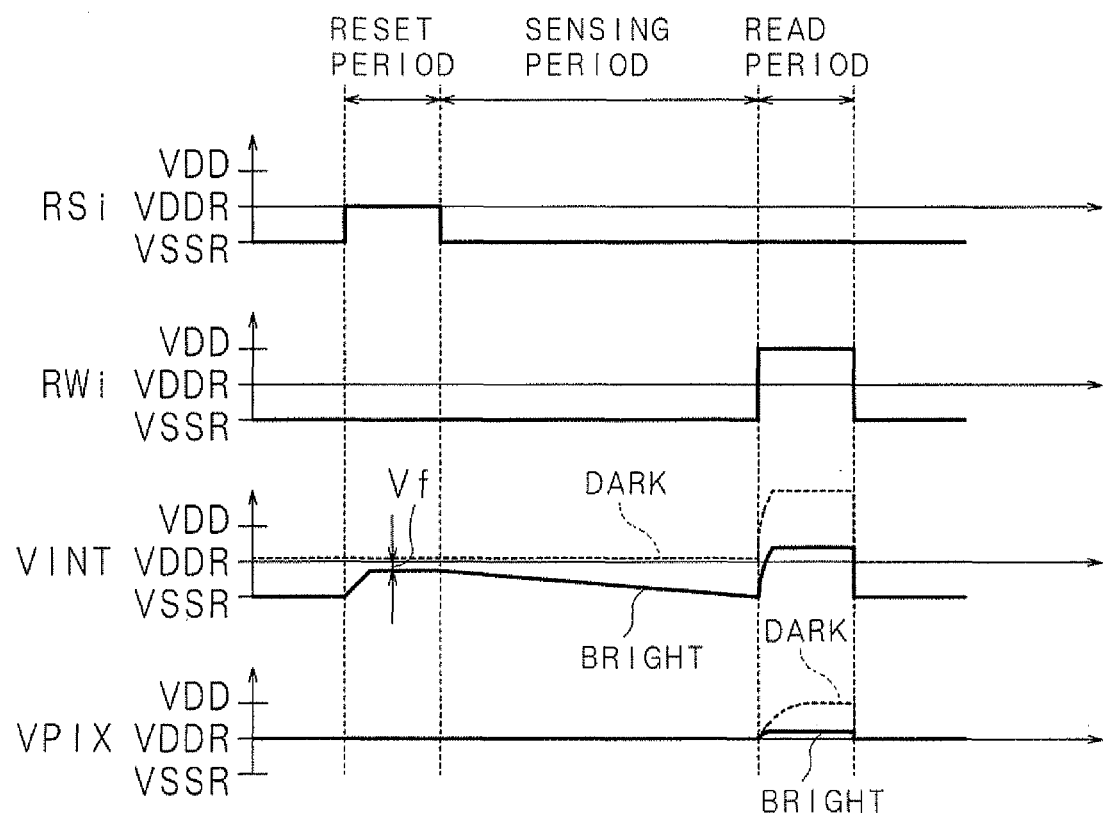
FIG. 7 is a diagram showing a timing chart concerning an operation of an image capture device circuit in the display apparatus according to the present invention.

Here, the operation of the image capture device circuit 144 is explained. FIG. 7 is a diagram showing a timing chart concerning an operation of the image capture device circuit 144 in the display apparatus 100 according to the present invention. In FIG. 7, voltage VINT shows potential at the node N in the image capture device circuit 144. Voltage VPIX is a output voltage outputted from the sensor signal line SSj shown in FIG. 6 and a voltage before being amplified by the amplifier 135.

The following description explains a reset period for resetting the image capture device circuit 144, a sensing period for performing sensing (image capture) of light reflected from the reflective image element 149B using the image capture device circuit 144, and a read period for reading a result of the sensing, separately.

First, the reset period is explained. In the reset period, voltage to be applied to the reset signal line RSi is momentarily switched from a low level (voltage VSSR) to a high level (voltage VDDR). On the other hand, voltage to be applied to the read signal line RWi remains in the low level (voltage VSSR). Thus, the high-level voltage is applied to the reset signal line RSi, and thereby current begins to flow in a forward direction (from an anode side to a cathode side) of the photodiode 145. As a result, the voltage VINT which is potential of the node N has a value shown in the following expression (1). Note that in the expression (1), an amount of voltage drop of the forward direction in the photodiode 145 is set to Vf.

$$VINT = VSSR + |VDDR - VSSR| - Vf \quad (1)$$

Therefore, the potential of the node N has a value smaller than the voltage VDDR by Vf, as shown in FIG. 7.

Here, since the voltage VINT is equal to or smaller than a threshold value for turning on the gate of the TFT 147, nothing is outputted from the sensor signal line SSj. For this reason, the voltage VPIX does not change. Also, a difference of the voltage VINT occurs between the electrodes of the capacitor 146. For this reason, a charge according to the difference is accumulated in the capacitor 146.

Next, the sensing period is explained. In the sensing period following the reset period, voltage to be applied to the reset signal line RSi is momentarily switched from a high level (voltage VDDR) to a low level (voltage VSSR). On the other hand, voltage to be applied to the read signal line RWi is still set to the low level (voltage VSSR).

Thus, voltage to be applied to the reset signal line RSi is changed to the low level, and thereby potential of the node N becomes higher than voltage of the reset signal line RSi and voltage of the read signal line RWi. For this reason, in the photodiode 145, voltage on the cathode side becomes higher than voltage on the anode side. That is, the photodiode 145 becomes in a reversely-biased state. In the reversely-biased state, when the photodiode 145 receives light emitted from the light source, current begins to flow from the cathode side of the photodiode 145 to the anode side thereof. As a result, the potential of the node N (i.e. voltage VINT) becomes lower as time passes, as shown in FIG. 7.

Note that since the voltage VINT continues to decrease in this manner, the gate of the TFT 147 is not turned on. Therefore, nothing is outputted from the sensor signal line SSj. For this reason, the voltage VPIX does not change.

Next, the read period is explained. In the read period following the sensing period, voltage to be applied to the reset signal line RSi is still set to a low level (voltage VSSR). On the other hand, voltage to be applied to the read signal line RWi is momentarily switched from a low level (voltage VSSR) to a high level (voltage VDD). Here, the voltage VDD has a value higher than that of the voltage VDDR.

Thus, the high-level voltage is momentarily applied to the read signal line RWi, and thereby the potential of the node N is increased via the capacitor 146 as shown in FIG. 7. Note that an amount by which the potential of the node N increases depends on the voltage to be applied to the read signal line RWi. Here, since the potential of the node N (i.e. voltage VINT) is increased to the threshold value for turning on the gate of the TFT 147 or more, the gate of the TFT 147 is turned on.

In this case, if fixed voltage is applied to the sensor signal line SDj (see FIG. 6) connected to a drain side of the TFT 147 in advance, voltage according to the potential of the node N is outputted from the sensor signal line SSj connected to a source side of the TFT 147, as shown in the graph of the voltage VPIX of FIG. 7.

Here, if an amount of light received by the photodiode 145 (hereinafter referred to as amount of received light) is low, a slope of a straight line shown in the graph of the voltage VINT of FIG. 7 becomes gentle. As a result, the voltage VPIX becomes higher compared with a case in which the amount of received light is high. Thus, the image capture device circuit 144 changes a value of the voltage to be outputted to the sensor signal line SSj according to the amount of received light by the photodiode 145.

By the way, the above description has explained the operation of one image capture device circuit 144 among m×n image capture device circuits. The following description explains the operation of respective image capture device circuit in the display panel section 140.

First, the image-capture-device drive circuit 133 applies predetermined voltage to all of the n sensor signal lines (SD1-SDn). Next, the image-capture-device drive circuit 133 applies voltage VDDR of a level higher than usual to the reset signal line RS1. Note that voltage of a low level is still applied to the other reset signal lines (RS2-RSm) and the read signal lines (RW1-RWm). Thereby, 'n' image capture device circuits of the first line in FIG. 6 go into the above-described reset period. Then, the 'n' image capture device circuits of the first line go into the sensing period as described above, and then the 'n' image capture device circuits of the first line go into the read period.

Note that the timing at which predetermined voltage is applied to all of the 'n' sensor signal lines (SD1-SDn) is not limited to the above-described timing, but only needs to be a timing at which the predetermined voltage is applied at least before the read period.

After the read period of the 'n' image capture device circuits of the first line is completed, the image-capture-device drive circuit 133 applies voltage VDDR of a level higher than usual to the reset signal line RS2. That is, the 'n' image capture device circuits of the second line go into the reset period. After the reset period is completed, the 'n' image capture device circuits of the second line go into the sensing period, and then go into the read period.

Thereafter, the above-described processing is sequentially performed with respect to the 'n' image capture device circuits of the third line, the 'n' image capture device circuits of the fourth line, . . . , the 'n' image capture device circuits of the mth line. As a result, a sensing result of the first line, a sensing result of the second line, . . . , a sensing result of the mth line are outputted in this order from the sensor signal lines (SS1-SSn).

On the other hand, during the above-described sensing period, the driver 130 controls the transmissive image elements 149A of the reflective panel 149, and blocks light emitted from the liquid crystal panel 148 so that the light cannot transmit. For example, during the sensing period, the driver 130 applies voltage between the electrode pair of the transmissive image element 149A respectively, and thereby causing the transmissive image element 149A to be in an opaque state.

Figure 8:
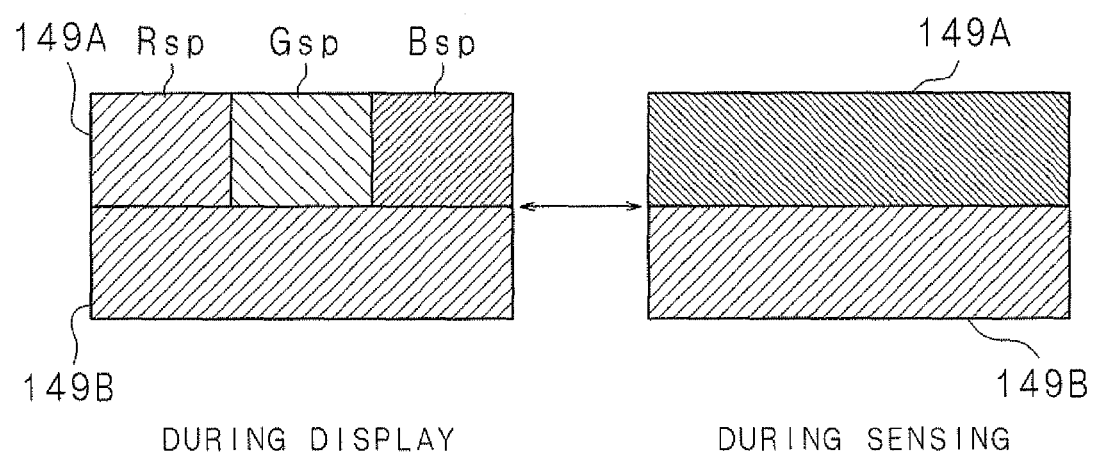
FIG. 8 is an explanatory diagram explaining control of a transmissive image element in the display apparatus according to the present invention.

FIG. 8 is an explanatory diagram explaining control of the transmissive image element 149A in the display apparatus 100 according to the present invention.

When the image capture device CCD (image-capture-device drive circuit 133) does not perform the sensing, for example, when a predetermined image is displayed on the liquid crystal panel 148, the driver 130 does not apply voltage to the transmissive image element 149A. Therefore, the transmissive image element 149A is in a transparent state, and the light emitted from the liquid crystal panel 148 can transmit. In other words, in this case, since the R image element Rsp, the G image element Gsp and the B image element Bsp of the liquid crystal panel 148 can be recognized visually via the transmissive image element 149A, an observer on the front side of the reflective panel 149 can recognize visually an image displayed on the liquid crystal panel 148.

On the other hand, when the image capture device CCD (image-capture-device drive circuit 133) performs the sensing, the driver 130 applies voltage to the transmissive image element 149A. Therefore, the transmissive image element 149A becomes in an opaque state, and the sensing (image capture) is performed in this state. That is, when the sensing is performed, the photodiode 145 of the image capture device CCD receives light reflected from the reflective image element 149B. Voltage according to the amount of light received by the photodiode 145 is outputted from the sensor signal line SSj.

Moreover, since the transmissive image element 149A is in the opaque state in this case, the front side of the transmissive image element 149A cannot be recognized visually from the back side of the transmissive image element 149A. Therefore, when the image capture device CCD (image-capture-device drive circuit 133) performs the sensing, an image of the front side of the transmissive image element 149A is prevented from being captured via the transmissive image element 149A.

In this case, although an observer on the front side of the reflective panel 149 cannot recognize visually an image displayed on the liquid crystal panel 148 during such a sensing, the transmissive image elements 149A are driven at double speed, thereby the observer on the front side of the reflective panel 149 can recognize visually an image displayed on the liquid crystal panel 148 without any problem. That is, the switching is performed between the transparent state and the opaque state in the transmissive image elements 149A at a very fast speed, for example, at a refresh rate of 120 Hz or 240 Hz, thereby the observer on the front side of the reflective panel 149 can recognize visually an image displayed on the liquid crystal panel 148 without any uncomfortable feeling.

Note that the present invention is not limited to this, but it may be configured so that the sensing is performed only for a period of time for which a predetermined image does not need to be displayed on the liquid crystal panel 148, or for a period of time for which such a need is low. For example, when the display apparatus 100 according to the present embodiment is applied to a display for advertisement located in a street or a passage etc., the display apparatus 100 may be configured so that the sensing is performed at midnight or weekend etc. at which the street etc. are empty.

As described above, in the display apparatus 100 according to the present invention, an image display condition on the front side of the liquid crystal panel 148 is reflected by the reflective panel 149, and the image capture devices CCD capture the image. That is, image capture data concerning each pixel P obtained by each image capture device CCD is sent to the signal processing section 183, and the signal processing section 183 acquires image data representing the overall image of the front side of the liquid crystal panel 148. Therefore, the display apparatus 100 is connected to an external display apparatus (not shown) and the image data is transmitted to the display apparatus via the communication section 174, thereby an appearance on the front side of the liquid crystal panel 148 can be confirmed using an image based on the image data, and the display apparatus 100 can be remotely maintained. For example, a dead pixel, display unevenness, burn-in of the display apparatus, and a luminance difference, a chromaticity difference etc. between displays in a system comprising a multi-display can be remotely monitored.

Note that in the display apparatus 100 according to the present invention, for example, performing alignment in advance is effective in order to prevent a position difference between the liquid crystal panel 148 and the reflective panel 149 at the time of the shipment.

Figure 9:
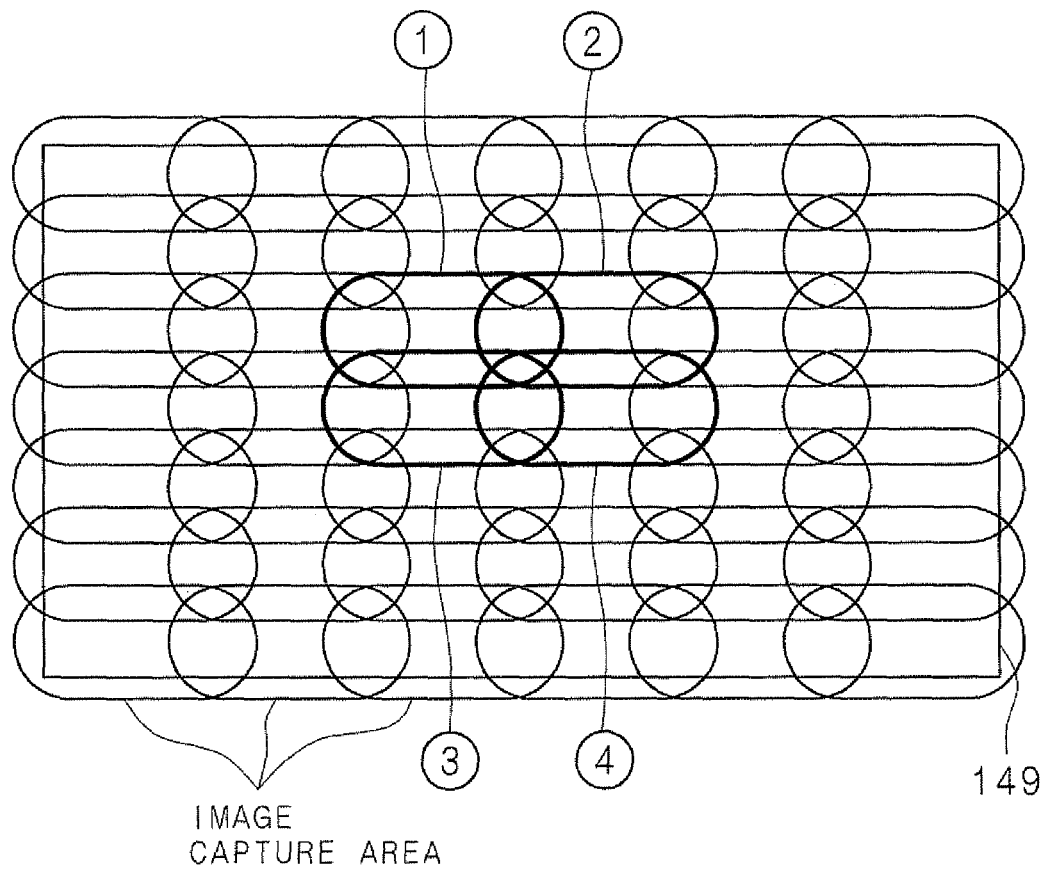
FIG. 9 is an exemplary diagram showing an example of areas to be captured by image capture devices (image capture area) in the display apparatus according to the present invention.

The following description explains two examples about the alignment of the liquid crystal panel 148 and the reflective panel 149. FIG. 9 is an exemplary diagram showing an example of areas to be captured by the image capture devices CCD (image capture area) in the display apparatus 100 according to the present invention. For convenience of the description, as shown in FIG. 9, a case is explained as an example, in which image capture areas to be captured by the image capture devices CCD are superimposed on each other. In FIG. 9, the processing of the 1-4 image capture areas (image capture areas which are captured by four CCDs and which are superimposed on each other) is explained as an example.

Figure 10:
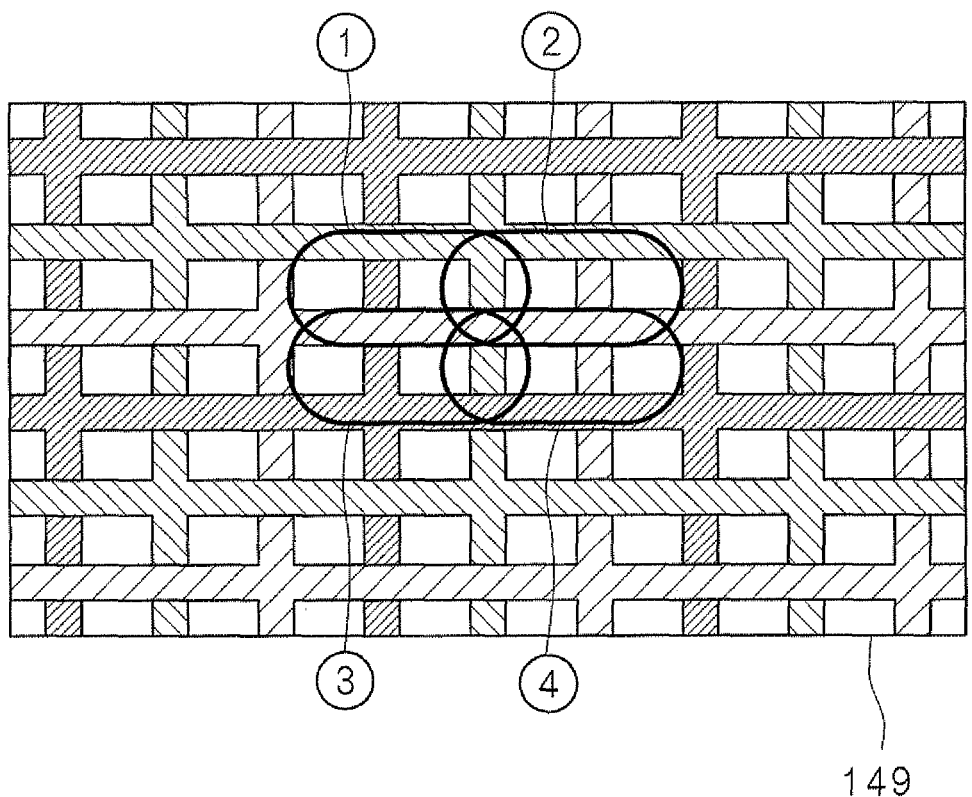
FIG. 10 is an explanatory diagram explaining alignment using a lattice pattern in the display apparatus according to the present invention.

First, there is a method using a lattice pattern as the alignment. FIGS. 10 and 11 are explanatory diagrams explaining the alignment using the lattice pattern. In the alignment, portions which are superimposed on the other image capture areas among the image capture areas (hatching portion in FIG. 11) are calculated based on a pattern into which the reflective panel 149 is divided like a lattice as shown in FIG. 10, and the alignment is performed so that the superimposed portions are uniform, or the alignment is performed so that the superimposed portions do not exist. In order to calculate the superimposed portions, technique known in itself is used, such as superposition and analysis and the like of images captured by the image capture devices CCD.

Figure 12:
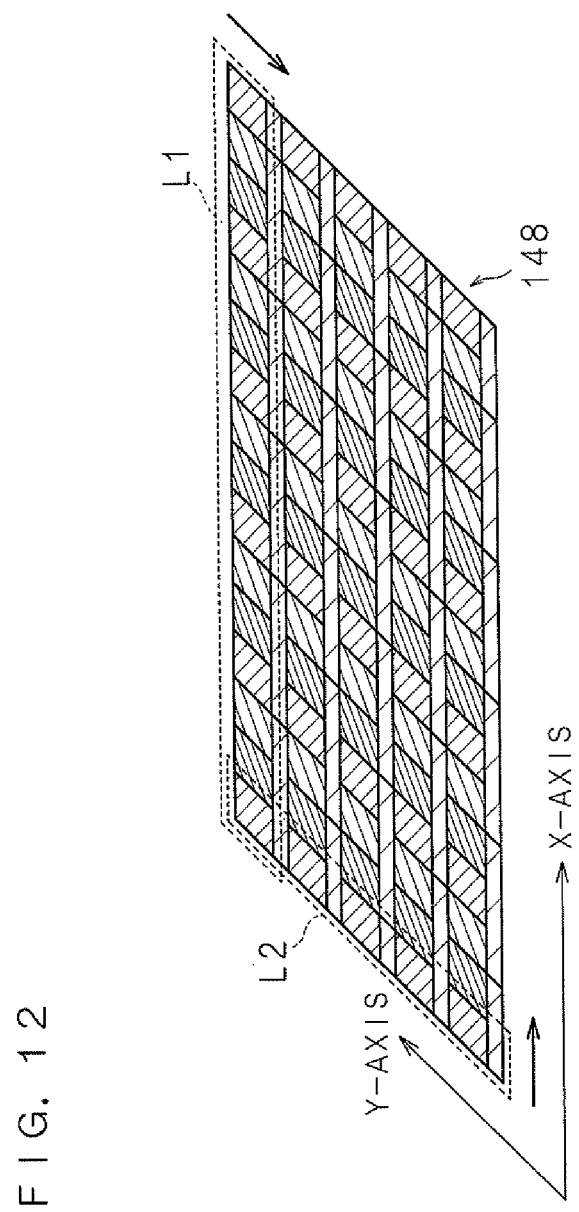
FIG. 12 is an explanatory diagram explaining the alignment using detection of a superposition period of a luminance signal waveforms in the display apparatus according to the present invention.

Next, a method for performing the alignment by detecting a superposition period of a luminance signal waveforms in the image capture areas is shown. FIGS. 12 and 13 are explanatory diagrams explaining the alignment based on a superposition period of the luminance signal waveforms. In the alignment, as shown in FIG. 12, a line L1 composed of pixels P of one row along the X-axis (surrounded by a dotted line in FIG. 12) and a line L2 composed of pixels P of one row along the Y-axis (surrounded by a dotted line in FIG. 12) are displayed while they are moved in respective arrow directions at a fixed timing, and thereby a superposition period of the luminance signal waveforms is detected. That is, when the lines are displayed while they are moved, although the luminance increases in each image capture area, the luminance increases together in the superimposed portions of the two image capture areas.

Figure 13A:
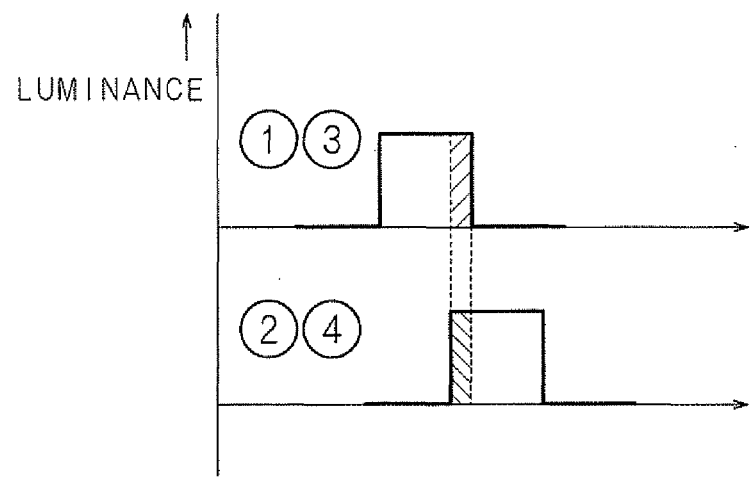
FIGS. 13A and 13B are explanatory diagrams explaining the alignment using detection of a superposition period of a luminance signal waveforms in the display apparatus according to the present invention.

For example, as described above, when the line L2 of the pixels P along the Y-axis is moved in the X-axial direction and is displayed, first, a luminance concerning the 1, 3 image capture areas increases, and then a luminance concerning the 2, 4 image capture areas increases. In this case, as shown in FIG. 13A, an increase range of the luminance concerning the 1, 3 image capture areas and an increase range of the luminance concerning the 2, 4 image capture areas have a time of period for which they overlap with each other (hatching portion, in FIG. 13A), and areas corresponding to the time of period can be identified as the superimposed portions.

Figure 13B:
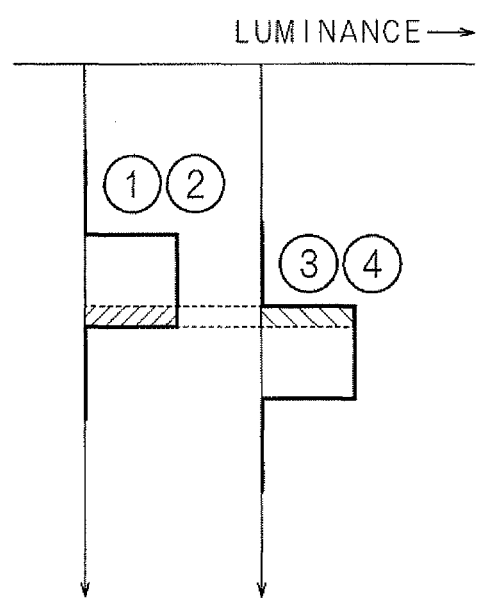

Also, when the line L1 of the pixels P along the X-axis is moved in the Y axial direction and is displayed, first, a luminance concerning the 1, 2 image capture areas increases, and then a luminance concerning the 3, 4 image capture areas increases. In this case, as shown in FIG. 13B, an increase range of the luminance concerning the 1, 2 image capture areas and an increase range of the luminance concerning the 3, 4 image capture areas have a time of period for which they overlap with each other (hatching portion, in FIG. 13B), and areas corresponding to the time of period can be identified as the superimposed portions.

Moreover, the display apparatus 100 according to the present invention is not limited to the above description. For example, the image capture device CCD may be configured so as to include a plurality of photodiodes, i.e. to be a so-called sensor array. Thus, when the image capture device CCD is the sensor array, the above-described alignment can be performed more easily, a space between the liquid crystal panel 148 and the reflective panel 149 can be appropriately adjusted, and the number of the required image capture devices CCD can be reduced.

Figure 14:
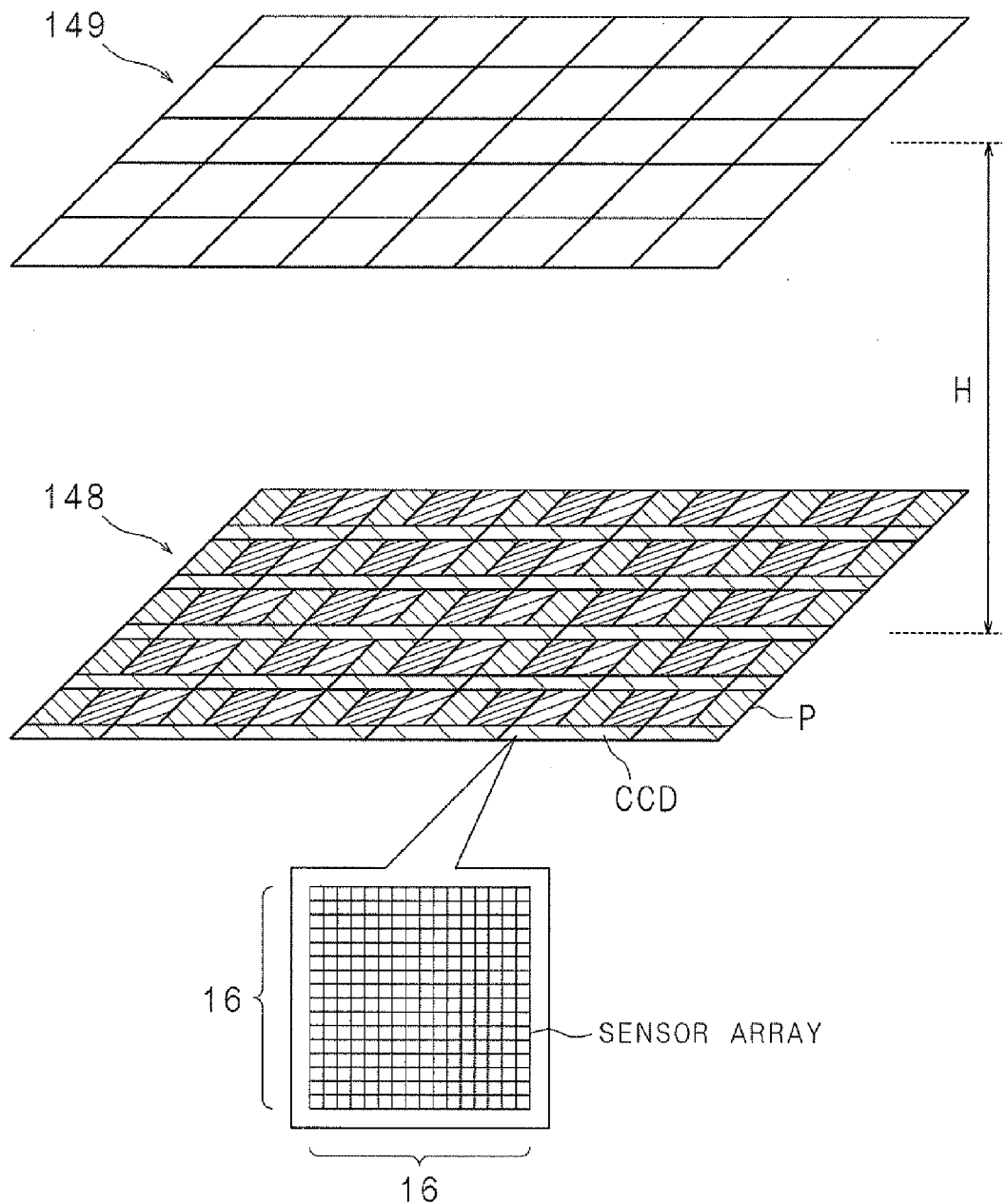
FIG. 14 is an explanatory diagram explaining relation between a space of the liquid crystal panel and a reflective panel and the number of required image capture devices in a case where the image capture device of the display apparatus according to the present invention is a sensor array.
Figure 15:
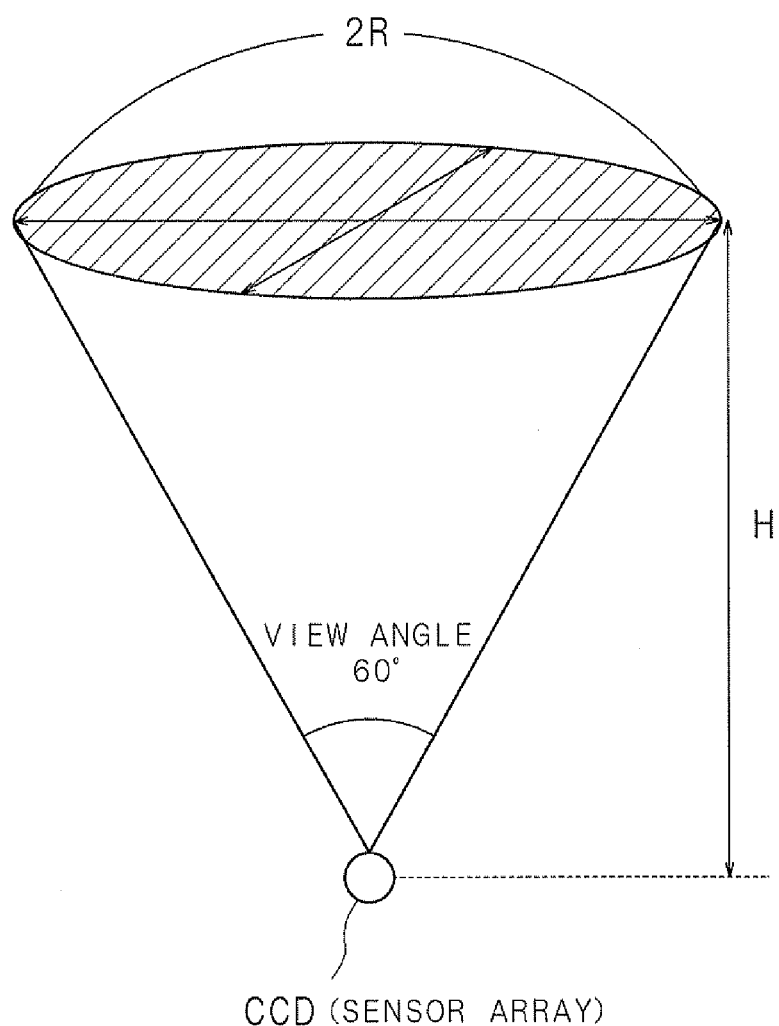
FIG. 15 is an explanatory diagram explaining relation between the space of the liquid crystal panel and the reflective panel and the number of required image capture devices in a case where the image capture device of the display apparatus according to the present invention is the sensor array.

The following description explains relation between the space of the liquid crystal panel 148 and the reflective panel 149 and the number of the required image capture devices in detail. FIGS. 14 and 15 are explanatory diagrams explaining relation between the space of the liquid crystal panel 148 and the reflective panel 149 and the number of required image capture devices CCD in a case where the image capture device CCD of the display apparatus 100 according to the present invention is the sensor array. For convenience of the description, a case is explained as an example, in which when the image capture device CCD is a sensor array with a resolution of 256 pixels (16×16 dots), a 60-inch FHD monitor has a screen resolution of 1920 dots in width and 1080 dots in height. Note that showing of the transmissive image elements 149A and the reflective image elements 149B in the reflective panel 149 is omitted in FIG. 14.

For example, when the space of the liquid crystal panel 148 and the reflective panel 149 is "H" and an view angle of the image capture device CCD is 60 degrees, an image capture area to be captured by the image capture device CCD of one sensor array can be represented as shown in FIG. 15. In the following, "2R" in FIG. 15 is called "visual field diameter".

The visual field diameter can be expressed with an equation of "$2R=2H/\sqrt{3}$" based on the Pythagorean proposition. That is, since the visual field diameter is an area which is capable of being captured by one image capture device CCD when the space of the liquid crystal panel 148 and the reflective panel 149 is "H", the longer the visual field diameter is, the larger the image capture area is, and the number of pixels which are capable of being captured (hereinafter referred to as image-capture effective pixel number) also increases. In other words, the longer the visual field diameter is, the smaller the number of required image capture devices CCD is.

For example, when "H" of the space between the liquid crystal panel 148 and the reflective panel 149 (hereinafter referred to as space H) is 1 mm, the visual field diameter (2R) is 1.15 mm based on the above-described equation. Since a substantial pixel pitch of the 60-inch FHD monitor is about 0.7 mm, the number of pixels contained in the image capture area in this case, i.e., the image-capture effective pixel number is one. In other words, only one pixel can be captured by one image capture device CCD, and as a result, the number of the required image capture devices CCD is 1920 (width)×1080 (height).

On the other hand, when the space H is 3 mm, the visual field diameter is 3.46 mm, the image-capture effective pixel number in this case is about 5×5, and the number of the required image capture devices CCD is 640×360.

Or, when the space H is 7 mm, the visual field diameter is 8.08 mm, the image-capture effective pixel number in this case is about 11×11, and the number of the required image capture devices CCD is 320×180.

As described above, as the space H increases to 1 mm, 3 mm and 7 mm, the number of the required image capture devices CCD significantly decreases to 1920×1080, 640×360, 320×180 respectively. Therefore, the space H is appropriately adjusted, thereby the number of the required image capture devices CCD can be reduced, and the reduction of the cost can be achieved.

On the other hand, for example, in a case where the liquid crystal panel 148 and the reflective panel 149 are located in a closely contact state, deflection due to differences of a thermal expansion coefficient and an elastic coefficient, etc. of the liquid crystal panel 148 and the reflective panel 149 occurs, and in some cases, a problem arises in the image display of the liquid crystal panel 148, or the liquid crystal panel 148 may be damaged. However, as described above, in the display apparatus 100 of the present invention, a predetermined space is provided between the liquid crystal panel 148 and the reflective panel 149, and thereby such a problem can be prevented from occurring.

Moreover, as in the case of detecting average a luminance, a chromaticity, etc. of a plurality of pixels, in a case in which not the strict sensing but the sensing for briefly conforming is performed, the space H is appropriately adjusted for response.

Embodiment 2

Figure 16:
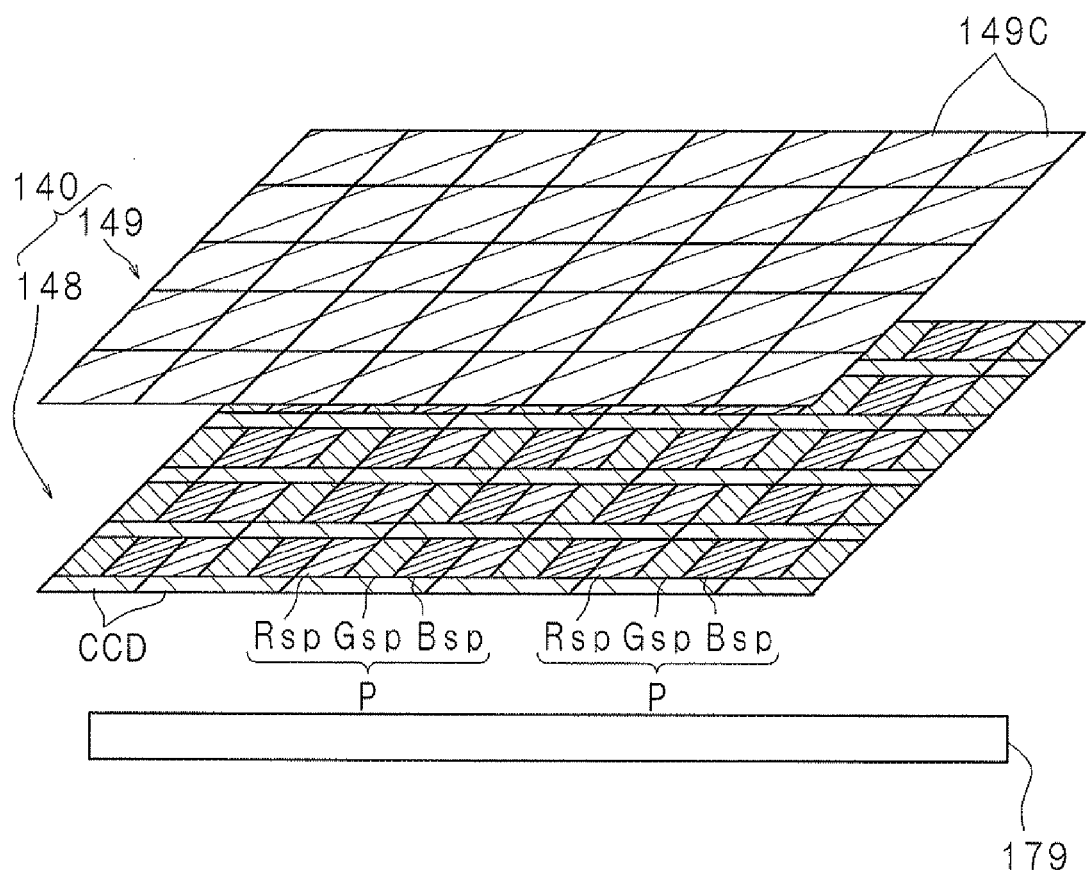
FIG. 16 is a schematic diagram showing the display panel section and the backlight in the display apparatus according to the present invention.

Although a display apparatus 100 according to Embodiment 2 of the present invention has a configuration similar to that of the display apparatus 100 according to Embodiment 1, a configuration of a reflective panel 149 is different from that of the reflective panel 149 according to Embodiment 1. FIG. 16 is a schematic diagram showing the display panel section 140 and the backlight 179 in the display apparatus 100 according to the present invention.

The display panel section 140 comprises the liquid crystal panel 148 and the reflective panel 149. The reflective panel 149 is located on the front side of the liquid crystal panel 148, and the backlight 179 is located on the back side of the liquid crystal panel 148. The liquid crystal panel 148 and the reflective panel 149 are located so that they face each other. Therefore, light emitted by the backlight 179 transmits the liquid crystal panel 148, and advances toward the reflective panel 149.

The reflective panel 149 is provided with a plurality of transmission-reflection image elements 149C arranged in a two-dimensional array. The transmission-reflection image elements 149C cause the light which has transmitted the liquid crystal panel 148 (pixels P) to transmit or reflect.

Figure 17:
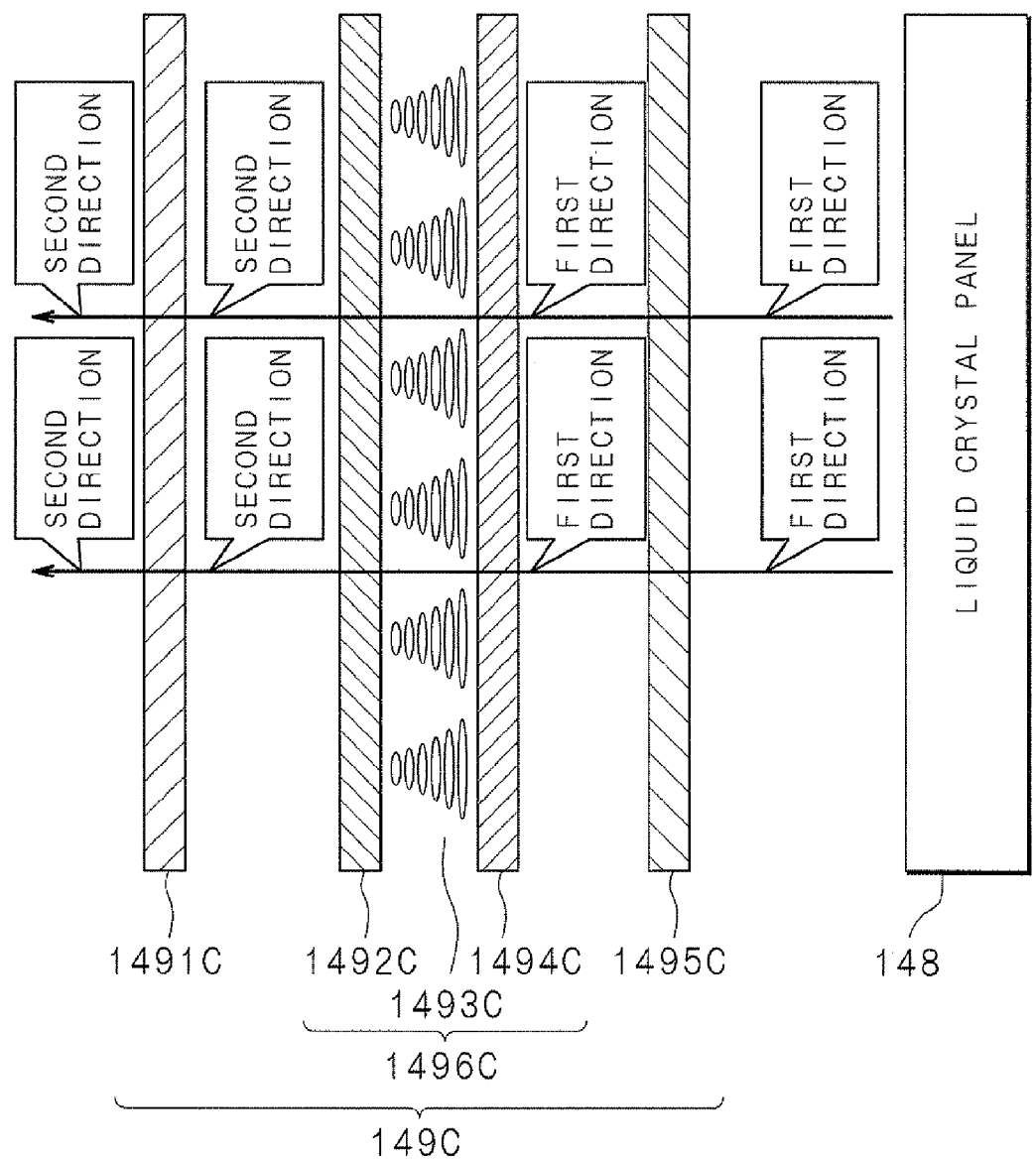
FIG. 17 is a schematic sectional diagram explaining a configuration and an operation of transmission-reflection image elements of the display apparatus according to the present invention.
Figure 18:
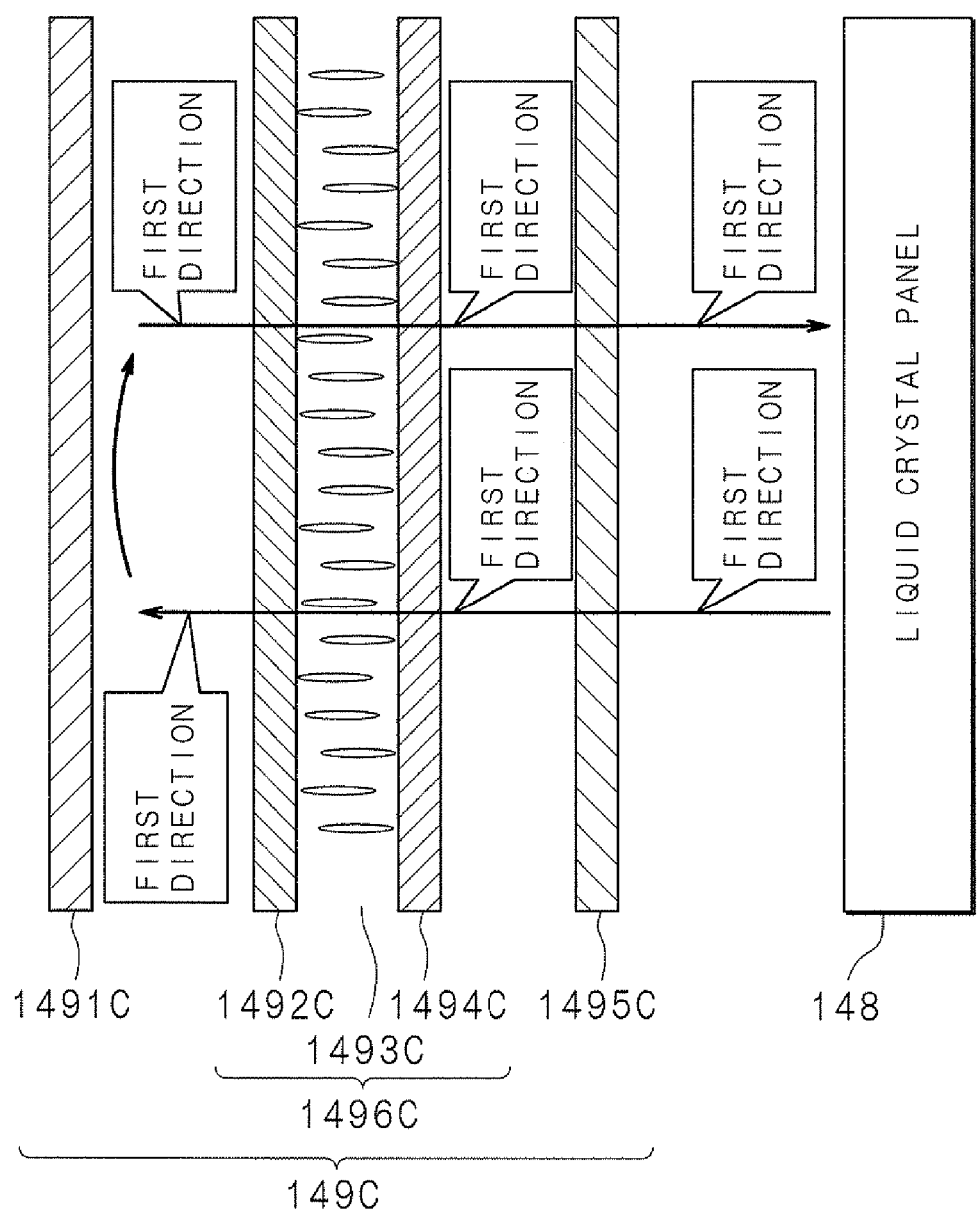
FIG. 18 is a schematic sectional diagram explaining the configuration and the operation of the transmission-reflection image elements of the display apparatus according to the present invention.

The following description explains the transmission-reflection image elements 149C in detail. FIGS. 17 and 18 are schematic sectional diagrams explaining a configuration and an operation of the transmission-reflection image elements 149C of the display apparatus 100 according to the present invention.

Each of the transmission-reflection image elements 149C includes a reflective type polarized light selector 1495C, a polarized light axis converter 1496C, and a reflective type polarized light selector 1491C, and the polarized light axis converter 1496C is provided with transparent electrodes 1492C, 1494C and a liquid crystal layer 1493C. The reflective type polarized light selector 1495C is located on a back side of the polarized light axis converter 1496C (toward the liquid crystal panel 148), and the reflective type polarized light selector 1491C is located on a front side of the polarized light axis converter 1496C.

On the other hand, in order to block light completely, the liquid crystal panel 148 is provided with a polarized light filter (not shown) for causing only light of a specific polarization direction to transmit, and light which has transmitted the liquid crystal panel 148 (pixels P) passes through the polarized light filter, and enters the reflective type polarized light selector 1495C of the transmission-reflection image element 149C. That is, the linearly polarized light having a specific polarization axis is emitted from the liquid crystal panel 148 (pixels P). For convenience of the description, the polarization direction in which the light is emitted from the liquid crystal panel 148 is called a first direction, and a direction in which the first direction is orthogonal to the polarization axis is called a second direction.

The reflective type polarized light selector 1495C cause a polarized light component of a predetermined direction to transmit, and reflects a polarized light component which is orthogonal to the polarized light component of the predetermined direction. That is, the reflective type polarized light selector 1495C causes the polarized light component of the first direction to transmit, and reflects the polarized light component of the second direction.

When entering polarized light transmits the polarized light axis converter 1496C, the polarized light axis converter 1496C can change a polarization axis of the polarized light. In detail, the polarized light axis converter 1496C can select a state in which a polarization axis of entering polarized light is changed or a state in which the polarization axis is not changed, by electric switching. A liquid crystal device provided with the liquid crystal layer 1493C and the transparent electrodes 1492C, 1494C for applying voltage to the liquid crystal layer 1493C, as described above is employed for the polarized light axis converter 1496C of the present embodiment.

A changeover switch (not shown) for changing application or non-application of voltage is connected to the transparent electrode 1492C. When voltage to be applied to the liquid crystal layer 1493C is not applied by the changeover switch, the liquid crystal layer 1493C becomes in a state in which a polarization axis of polarized light which has entered is changed (hereinafter referred to as axis change state). On the other hand, when voltage to be applied to the liquid crystal layer 1493C is applied by the changeover switch, the liquid crystal layer 1493C becomes in a state in which a polarization axis of polarized light which has entered is not changed (hereinafter referred to as axis invariant state).

That is, the liquid crystal layer 1493C is a so-called twist nematic (TN) type liquid crystal which is configured so that when voltage is not applied, longitudinal axes of liquid crystal molecules are continuously twisted 90 degrees between the transparent electrode 1492C and the transparent electrode 1494C. In detail, in the axis change state in which voltage is not applied, orientations of the liquid crystal molecules are defined as a direction in which polarized light of the first direction that has entered from the reflective type polarized light selector 1495C is changed to polarized light of the second direction.

On the other hand, in the axis invariant state in which voltage is applied, as shown in FIG. 18, the liquid crystal molecules of the liquid crystal layer 1493C become in a state where they are standing vertically to the transparent electrodes 1492C, 1494C, i.e., in a state where a polarization axis of light which has entered from the reflective type polarized light selector 1495C cannot be changed.

The reflective type polarized light selector 1491C is a member which causes a polarized light component of a predetermined direction to transmit and reflects a linearly polarized light component of a direction orthogonal to the predetermined direction. In the present embodiment, the reflective type polarized light selector 1491C is configured so as to reflect a polarized light component of the first direction among entering polarized light, and cause a polarized light component of the second direction to transmit.

Since the transmission-reflection image element 149C has the above configuration, the transmission-reflection image element 149C can selectively switch a state of reflecting light emitted from the liquid crystal panel 148, or a state of causing light emitted from the liquid crystal panel 148 to transmit. The following description explains the state of reflecting light emitted from the liquid crystal panel 148 and the state of causing light emitted from the liquid crystal panel 148 to transmit, in detail.

As shown in FIG. 17, when the changeover switch is turned off and liquid crystal molecules of the liquid crystal layer 1493C of the polarized light axis converter 1496C are in the axis change state in which they are twisted 90 degrees, the transmission-reflection image element 149C is in the state of causing the light to transmit.

When predetermined image light is emitted from the liquid crystal panel 148 towards the transmission-reflection image element 149C, the image light is polarized light of the first direction, as described above. Therefore, a polarization axis of the image light coincides with a transmission polarization axis of the reflective type polarized light selector 1495C, and the image light transmits the reflective type polarized light selector 1495C and enters the polarized light axis converter 1496C.

In this case, since the liquid crystal layer 1493C of the polarized light axis converter 1496C is in the axis change state in which the liquid crystal molecules are twisted 90 degrees, a polarization axis of the image light which is polarized light of the first direction that has entered through the transparent electrode 1494C rotates along the twist of the liquid crystal molecules, and the image light becomes polarized light of the second direction and is emitted from the transparent electrode 1492C. Since a polarization axis of the image light which is the polarized light of the second direction coincides with a transmission polarization axis of the reflective type polarized light selector 1491C, the image light can transmit the reflective type polarized light selector 1491C, and can be recognized visually by an observer on the front side of the transmission-reflection image element 149C.

On the other hand, as shown in FIG. 18, when the changeover switch is turned on and the liquid crystal molecules of the liquid crystal layer 1493C of the polarized light axis converter 1496C are in the axis invariant state in which they are standing vertically to the transparent electrodes 1492C, 1494C, the transmission-reflection image element 149C is in the state of reflecting the light.

Image light to be emitted from the liquid crystal panel 148 towards the transmission-reflection image elements 149C is polarized light of the first direction, as described above. Therefore, a polarization axis of the image light coincides with the transmission polarization axis of the reflective type polarized light selector 1495C, and the image light transmits the reflective type polarized light selector 1495C and enters the polarized light axis converter 1496C.

In this case, since the liquid crystal layer 1493C of the polarized light axis converter 1496C is in the axis invariant state in which the liquid crystal molecules are standing vertically to the transparent electrodes 1492C, 1494C, the image light of polarized light of the first direction that has entered through the transparent electrode 1494C is emitted from the transparent electrode 1492C, without the change of a polarization axis.

However, since the image light emitted from the polarized light axis converter 1496C is still polarized light of the first direction, the polarization axis of the image light does not coincide with the transmission polarization axis of the reflective type polarized light selector 1491C. Therefore, the image light is reflected by the reflective type polarized light selector 1491C.

The reflected image light (hereinafter referred to as reflected image light) transmits the polarized light axis converter 1496C again. In this case, since the polarized light axis converter 1496C is in the axis invariant state as described above, the reflected image light which has transmitted the polarized light axis converter 1496C is still polarized light of the first direction.

Thus, since the reflected image light emitted from the polarized light axis converter 1496C is the polarized light of the first direction, a polarization axis of the reflected image light coincides with the transmission polarization axis of the reflective type polarized light selector 1495C, and the reflected image light transmits the reflective type polarized light selector 1495C and enters the liquid crystal panel 148. The image capture devices CCD perform the sensing (image capture) of the reflected image light which has entered the liquid crystal panel 148.

Figure 19:
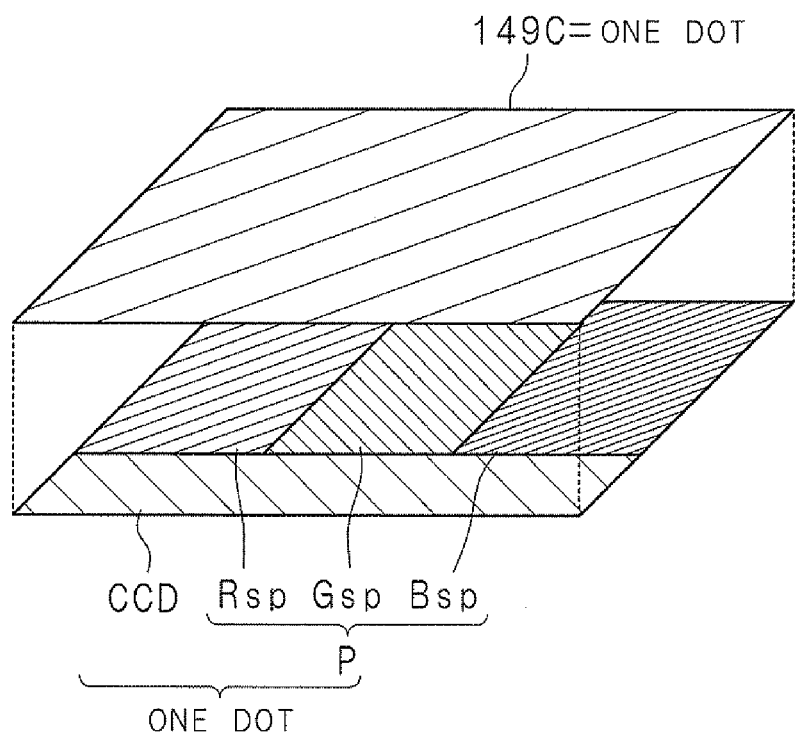
FIG. 19 is an explanatory diagram explaining a positional relationship of a pixel, an image capture device and a transmission-reflection image element in the display apparatus according to the present invention.
Figure 20:
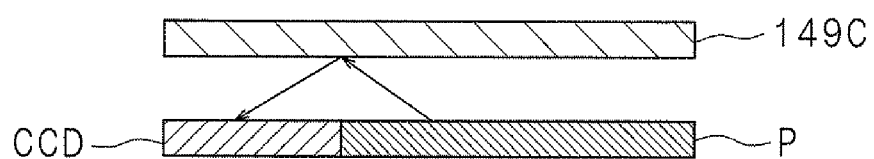
FIG. 20 is an explanatory diagram explaining a positional relationship of the pixel, the image capture device and the transmission-reflection image element in the display apparatus according to the present invention.

FIGS. 19 and 20 are explanatory diagrams explaining a positional relationship of the pixel P, the image capture device CCD and the transmission-reflection image element 149C in the display apparatus 100 according to the present invention.

A pair of the pixel P and the image capture device CCD constitutes one dot, and one transmission-reflection image element 149C corresponds to one dot. The dot which is constituted by the pixel P and the image capture device CCD, and the dot which is constituted by the transmission-reflection image element 149C have the same area in which the reflective panel 149 and the liquid crystal panel 148 are opposed to each other, and are located so that positions of the dots align.

When the transmission-reflection image element 149C is in the state of reflecting light, an image on the front side of the pixel P is reflected by the transmission-reflection image element 149C, and the reflected image is captured by the image capture device CCD, with the above-described method.

Figure 21:
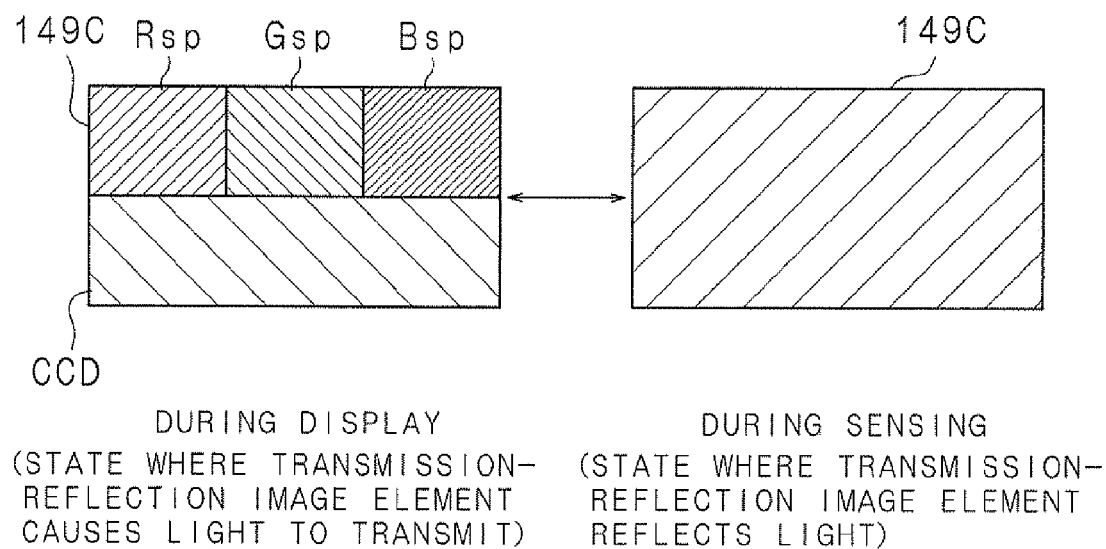
FIG. 21 is an explanatory diagram explaining control of a transmission-reflection image element in the display apparatus according to the present invention.

FIG. 21 is an explanatory diagram explaining control of a transmission-reflection image element 149C in the display apparatus 100 according to the present invention.

When the image capture device CCD (image-capture-device drive circuit 133) does not perform the sensing as explained in Embodiment 1, for example, when a predetermined image is displayed on the liquid crystal panel 148, the driver 130 does not apply voltage to the transmission-reflection image element 149C. Therefore, since the transmission-reflection image element 149C is in the state of causing light to transmit, light emitted from the liquid crystal panel 148 can transmit the transmission-reflection image element 149C. In other words, in this case, since the R image element Rsp, the G image element Gsp, the B image element Bsp and the image capture device CCD of the liquid crystal panel 148 can be visually recognized via the transmission-reflection image element 149C, an observer on the front side of the reflective panel 149 can recognize visually an image displayed on the liquid crystal panel 148.

On the other hand, when the image capture device CCD (image-capture-device drive circuit 133) is in the sensing period for performing the sensing (see FIG. 7), the driver 130 applies voltage to the transmission-reflection image element 149C. Therefore, the transmission-reflection image element 149C becomes in the state of reflecting light, and the sensing (image capture) is performed in this state. That is, when the sensing is performed, the photodiode 145 of each image capture device CCD receives light reflected by the transmission-reflection image element 149C. Voltage according to an amount of light received by each photodiode 145 is outputted from the sensor signal line SSj.

In this case, a back side of the transmission-reflection image element 149C, i.e., a pixel P (liquid crystal panel 148) with which the transmission-reflection image element 149C aligns cannot be visually recognized via the transmission-reflection image element 149C. In other words, although an observer on the front side of the reflective panel 149 cannot visually recognize an image displayed on the liquid crystal panel 148 during the sensing, the transmission-reflection image element 149C is driven at double speed, thereby the observer on the front side of the reflective panel 149 can visually recognize an image displayed on the liquid crystal panel 148 without any problem. That is, the transmission-reflection image element 149C is switched between the state of causing light to transmit and the state of reflecting light at a very fast speed, for example, at a refresh rate of 120 Hz or 240 Hz, and thereby an image not causing uncomfortable feeling is displayed on the liquid crystal panel 148 for an observer who is present on the front side of the reflective panel 149.

The same parts as in Embodiment 1 are designated with the same reference numerals, and detailed explanations thereof will be omitted.

As this description may be embodied in several forms without departing from the spirit of essential characteristics thereof, the present embodiment is therefore illustrative and not restrictive, since the scope is defined by the appended claims rather than by the description preceding them, and all changes that fall within metes and bounds of the claims, or equivalence of such metes and bounds thereof are therefore intended to be embraced by the claims.

What is claimed is:

1. A display apparatus which comprises a liquid crystal panel provided with a plurality of pixels and displays an image, comprising:
    a reflective panel which is arranged opposite to the liquid crystal panel, and reflects light emitted from the liquid crystal panel; and
    image capture devices which are located in the liquid crystal panel, and capture an image using light reflected by the reflective panel.

2. The display apparatus according to claim 1, wherein the reflective panel is provided with:
    reflective image elements which are provided with a reflective surface in a face opposite to the liquid crystal panel; and
    transmissive image elements which cause light emitted from the pixel to transmit selectively.

3. The display apparatus according to claim 2, wherein
    in the reflective panel, reflection dots including the reflective image elements and the transmissive image elements are arranged in a two-dimensional array, and
    in the liquid crystal panel, display dots including the pixels and the image capture devices are arranged in a two-dimensional array, and
    the reflection dots are aligned with the display dots with respect to positions in which the reflective panel is arranged opposite to the liquid crystal panel.

4. The display apparatus according to claim 2, wherein
    the capture device is arranged opposite to the reflective image element, and
    the pixel is arranged opposite to the transmissive image element, and
    a part of the reflective image element overlaps with the pixel.

5. The display apparatus according to claim 1, wherein
    the reflective panel is provided with a transmission-reflection image element which causes light emitted from the pixel to transmit or reflect.

6. The display apparatus according to claim 5, wherein
    in the reflective panel, the transmission-reflection image elements are arranged in a two-dimensional array, and
    in the liquid crystal panel, display dots including the pixels and the image capture devices are arranged in a two-dimensional array, and
    the transmission-reflection image elements are aligned with the display dots with respect to positions in which the reflective panel is arranged opposite to the liquid crystal panel.

7. The display apparatus according to claim 5, wherein
    the transmission-reflection image element comprises:
    two polarized light selectors which are arranged in a direction in which polarization axes are orthogonal; and
    a liquid crystal layer held between the polarized light selectors.

* * * * *